(12) United States Patent
Jones et al.

(10) Patent No.: US 8,894,403 B2
(45) Date of Patent: *Nov. 25, 2014

(54) PRESSWARE FORMING APPARATUS, COMPONENTS THEREFORE AND METHODS OF MAKING PRESSWARE THEREFROM

(71) Applicant: Dixie Consumer Products LLC, Atlanta, GA (US)

(72) Inventors: Albert D. Jones, Myrtle Beach, SC (US); Mark B. Littlejohn, Appleton, WI (US); Thomas W. Zelinski, Menasha, WI (US); Kenneth J. Zirbel, Kaukauna, WI (US); Luke G. Stumpf, Kaukauna, WI (US)

(73) Assignee: Dixie Consumer Products LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,024

(22) Filed: Apr. 29, 2013

(65) Prior Publication Data

US 2013/0309346 A1 Nov. 21, 2013

Related U.S. Application Data

(63) Continuation of application No. 11/465,694, filed on Aug. 18, 2006, now Pat. No. 8,430,660.

(60) Provisional application No. 60/709,649, filed on Aug. 19, 2005.

(51) Int. Cl.
| | | |
|---|---|---|
| B29C 43/04 | (2006.01) | |
| B29C 43/00 | (2006.01) | |
| B31B 43/00 | (2006.01) | |
| B29C 43/34 | (2006.01) | |
| B29L 31/00 | (2006.01) | |
| B29C 43/36 | (2006.01) | |

(52) U.S. Cl.
CPC ............... B29C 43/003 (2013.01); B31B 43/00 (2013.01); B29C 43/34 (2013.01); B31B 2201/223 (2013.01); B29L 2031/712 (2013.01); B29C 2043/3623 (2013.01); B29C 43/36 (2013.01); B29C 2793/0081 (2013.01)
USPC ........... 425/193; 425/195; 425/346; 425/394; 425/411

(58) Field of Classification Search
USPC ......... 425/186, 193, 394, 397, 410–412, 422, 425/436 R, 436 RM; 493/56, 142, 167
See application file for complete search history.

(56) References Cited

U.S. PATENT DOCUMENTS

| | | |
|---|---|---|
| 1,793,089 A | 2/1931 | Heyes |
| 2,332,937 A | 10/1943 | Schmidberger |

(Continued)

OTHER PUBLICATIONS

W.A. Gloger, Pigments (Inorganic), Kirk-Othmer, Encyclopedia of Chemical Technology, Third Edition, pp. 798, 799, 815 and 831-836, vol. 17, John Wiley & Sons, New York, USA, 1982.

*Primary Examiner* — Joseph S Del Sole
*Assistant Examiner* — Thukhanh Nguyen
(74) *Attorney, Agent, or Firm* — William W. Letson

(57) ABSTRACT

The present invention provides an improved pressware forming apparatus. At least one of die pairs used in the apparatus can be narrowed in a cross-direction as compared to the cross-directional width of pressware forming tools used in prior an apparatus. The present invention allows addition of at least one additional die pair in the pressware forming tool when used in a standard sized pressware forming apparatus. The present invention also provides components for use in such apparatus and methods of making pressware from the apparatus herein.

20 Claims, 17 Drawing Sheets

(56) References Cited

U.S. PATENT DOCUMENTS

| | | |
|---|---|---|
| 2,595,046 A | 4/1952 | Amberg |
| 2,832,522 A | 4/1958 | Schlanger |
| 3,305,434 A | 2/1967 | Bernier et al. |
| 3,824,058 A | 7/1974 | Axer et al. |
| 4,150,936 A | 4/1979 | Shioi et al. |
| 4,242,293 A | 12/1980 | Dowd |
| 4,588,539 A | 5/1986 | Rossi et al. |
| 4,606,496 A | 8/1986 | Marx et al. |
| 4,609,140 A | 9/1986 | Van Handel et al. |
| 4,721,499 A | 1/1988 | Marx et al. |
| 4,721,500 A | 1/1988 | Van Handel et al. |
| 4,755,128 A | 7/1988 | Alexander et al. |
| 4,781,566 A | 11/1988 | Rossi et al. |
| 4,832,676 A | 5/1989 | Johns et al. |
| 5,088,640 A | 2/1992 | Littlejohn |
| 5,129,874 A | 7/1992 | Hayes, III |
| 5,203,491 A | 4/1993 | Marx et al. |
| 5,249,946 A | 10/1993 | Marx |
| 5,326,020 A | 7/1994 | Cheshire et al. |
| 5,364,583 A | 11/1994 | Hayashi |
| 5,693,346 A | 12/1997 | Dull et al. |
| 5,938,112 A | 8/1999 | Sandstrom |
| 6,139,307 A | 10/2000 | Plourde et al. |
| 6,261,082 B1 | 7/2001 | Han |
| 6,284,101 B1 | 9/2001 | Marx |
| 6,474,497 B1 | 11/2002 | Littlejohn et al. |
| 6,527,687 B1 | 3/2003 | Fortney et al. |
| 6,585,506 B1 | 7/2003 | Johns et al. |
| 6,589,043 B1 | 7/2003 | Johns et al. |
| 6,592,357 B1 | 7/2003 | Johns et al. |
| 6,715,630 B2 | 4/2004 | Littlejohn et al. |
| 6,733,852 B2 | 5/2004 | Littlejohn et al. |
| 6,783,720 B2 | 8/2004 | Johns et al. |
| 6,893,693 B2 | 5/2005 | Swoboda et al. |
| 6,908,296 B2 | 6/2005 | Johns et al. |
| 6,932,753 B1 | 8/2005 | Smith et al. |
| 7,048,176 B2 | 5/2006 | Littlejohn et al. |
| 7,337,943 B2 | 3/2008 | Johns et al. |
| 7,419,462 B1 | 9/2008 | Zelinski |
| D625,201 S | 10/2010 | Wichmann |
| 8,047,834 B2 | 11/2011 | Sofronie et al. |
| 8,430,660 B2 | 4/2013 | Johns et al. |
| 2005/0192171 A1 | 9/2005 | Grischenko et al. |
| 2006/0208054 A1 | 9/2006 | Littlejohn et al. |
| 2007/0042072 A1 | 2/2007 | Johns et al. |
| 2008/0242525 A9 | 10/2008 | Johns et al. |
| 2009/0114659 A1 | 5/2009 | Littlejohn |

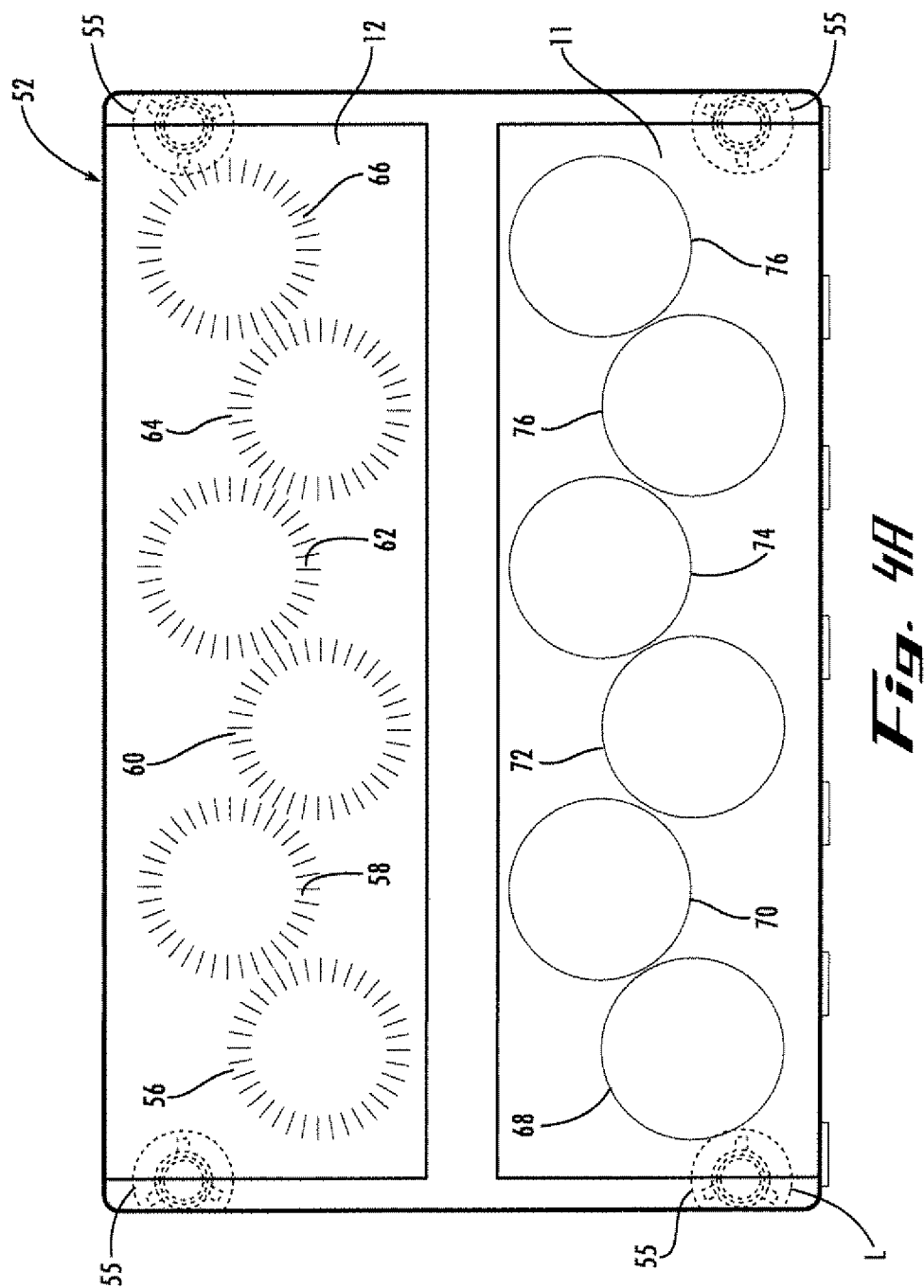

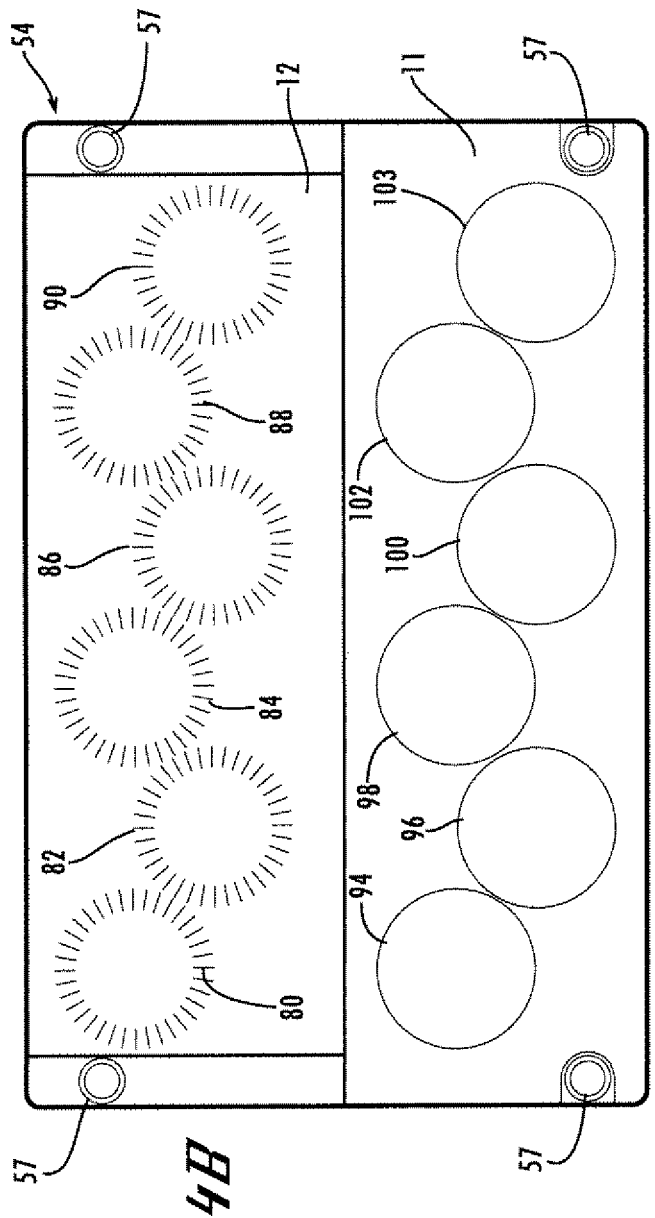
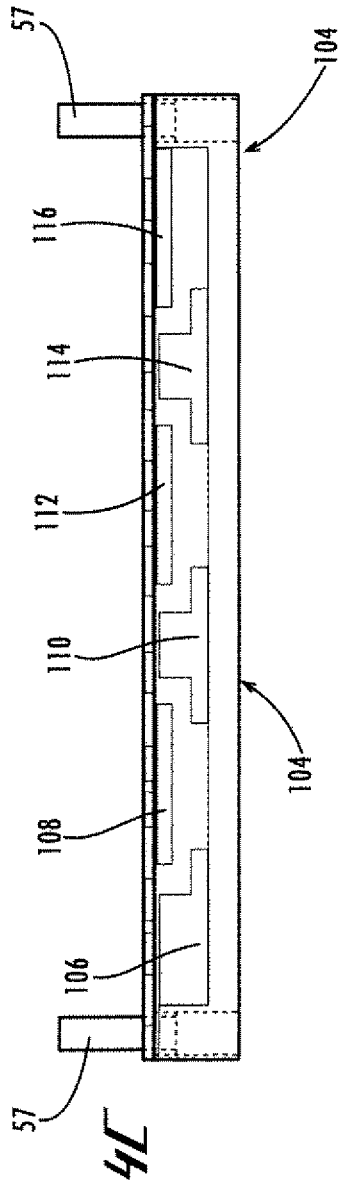

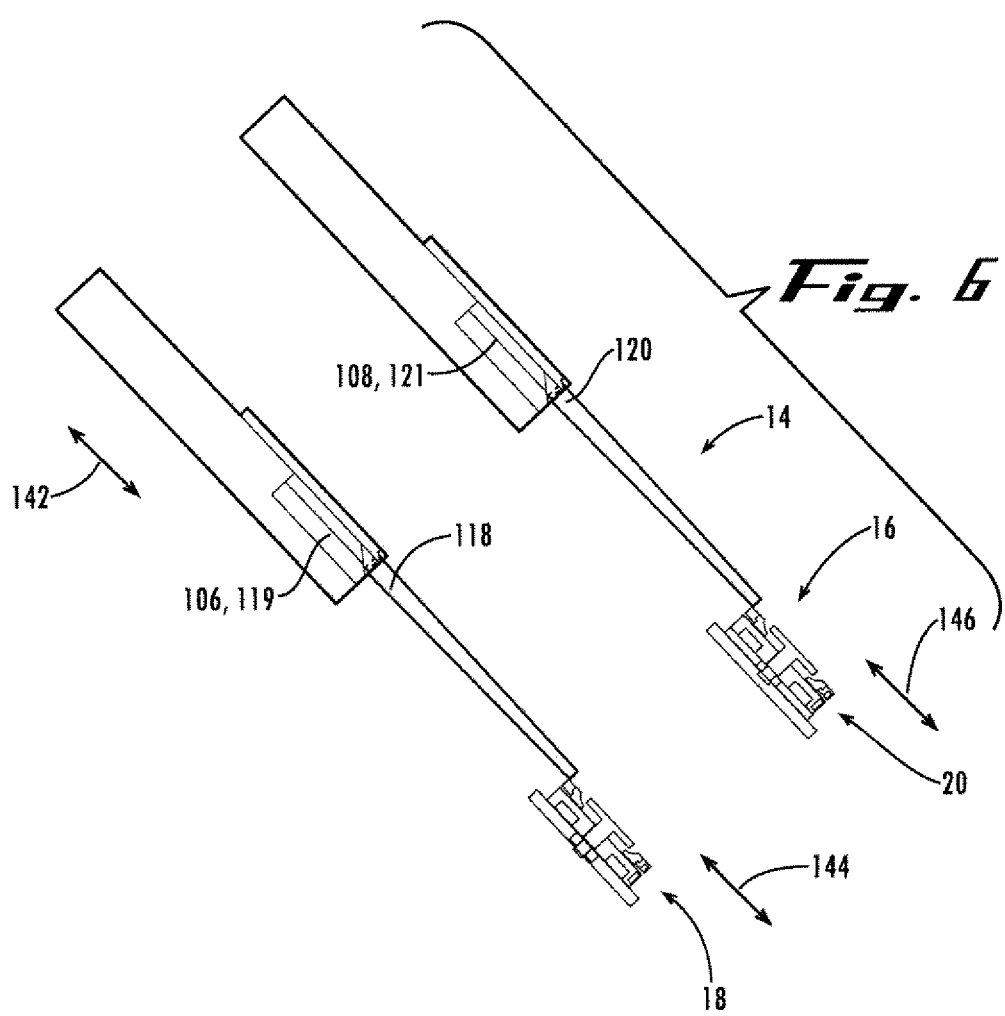

PRESSWARE FORMING APPARATUS, COMPONENTS THEREFORE AND METHODS OF MAKING PRESSWARE THEREFROM

CROSS-REFERENCE TO RELATED APPLICATIONS

This application is a continuation of U.S. patent application Ser. No. 11/465,694, filed Aug. 18, 2006, now U.S. Pat. No. 8,430,660, which claims priority to U.S. Provisional Patent Application No. 60/709,649, filed Aug. 19, 2005, each of which is incorporated by reference herein in its entirety.

FIELD OF THE INVENTION

The present invention provides an improved pressware forming apparatus. At least one of die pairs used in the apparatus can be narrowed in a cross-direction as compared to the cross-directional width of pressware forming tools used in prior art apparatus. The present invention allows addition of at least one additional die pair in the pressware forming tool when used in a standard-sized pressware forming apparatus. The present invention also provides components for use in such apparatus and methods of making pressware from the apparatus herein.

BACKGROUND OF THE INVENTION

Machinery for making pressware containers typically comprises an optional scoring station, a blanking station and a forming station. In use, one or more paperboard webs is optionally scored in a scoring station and cut into blanks in the blanking station. The blanks (which can comprise a single blank or stack of blanks cut from multiple webs) are then typically directed along an inclined plane to be gravity fed to the forming station. The forming station generally comprises a pressware forming tool which, in turn, comprises a plurality of die pairs. The forming tool is oriented in the cross-direction of the press. Such die pairs generally comprise an upper male portion or punch as well as a lower female portion or die. The female die generally comprises a central knock-out portion mounted on a shaft with a tapered end. The tapered end cooperates with a corresponding taper in a mounting bushing to limit travel of the knockout. After pressing, the pressware is directed by the knockout (such as disclosed in U.S. Pat. No. 6,589,043, which disclosure is incorporated herein in its entirety by this reference) and air assist to a stacking and packaging area. (When a blank fed operation is used, the scoring station and blanking stations are not present.)

Pressware apparatus are expensive and durable equipment. Once purchased, this equipment generally can be used for 10 or 15 or more years before needing replacement. The expense and durability of pressware apparatus make it difficult to obtain efficiencies in the manufacture of pressware. It is generally only possible to find efficiencies in areas peripheral to the manufacture of the pressware e.g., reduction in paperboard weight, coatings etc. Accordingly, conventional methods of improving efficiencies generally result in reduction of the quality of the pressware product formed.

It would be desirable to be able to modify existing pressware apparatus to provide efficiencies in the pressware manufacturing process itself without affecting the quality of the pressware product. The present invention provides for more efficient use of available cross-directional width in a standard-sized forming station by allowing the addition of at least one additional die pair in the pressware forming tool. This has been found to markedly improve the output of a pressware forming apparatus without the drawbacks noted above. Also, the present invention provides components that can be used in conjunction with this improved efficiency pressware apparatus.

SUMMARY OF THE INVENTION

The present invention provides an improved pressware forming apparatus. At least one of the die pairs used in the apparatus can be narrowed in a cross-direction as compared to the cross-directional width of a pressware forming tool used in prior art apparatus. The at least one narrowed die pair of the present invention allows addition of at least one additional die pair to the pressware forming tool while still allowing use of a standard-sized forming station. The apparatus of the present invention can have components that are designed to work with the present invention. Such components can include one or more of enhanced ring stops, re-dimensioned pins and exterior mounted female bushings on the blanking die. In a further aspect, the present invention provides a conveying system that is suitable for use with the present invention. The apparatus and methods of the present invention provide improved efficiencies using standard width forming stations thus providing marked improvements in efficiency as compared to prior art pressware forming apparatus.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The invention is described in detail below with reference to the various drawings, wherein like numerals designate similar parts.

FIG. 4A is a schematic top view of a blanking punch shoe; FIG. 4B is a schematic top view of a blanking die shoe; and FIG. 4C is a schematic end view of the die shoe showing multi-level feeding slots.

FIG. 6 is a schematic layout showing die pairs at different levels in a forming station and blank conveyor layers.

FIG. 7 is an enlarged schematic view showing two die pairs arranged in a cross-direction that are disposed in a forming station at different forming heights.

FIGS. 16, 17 and 18 illustrate different views of a forming die pair with a unitary forming member on the punch and operation of the die pair with a pneumatic ejector disposed on a punch of the die pair.

DETAILED DESCRIPTION OF THE INVENTION

Figure 1:
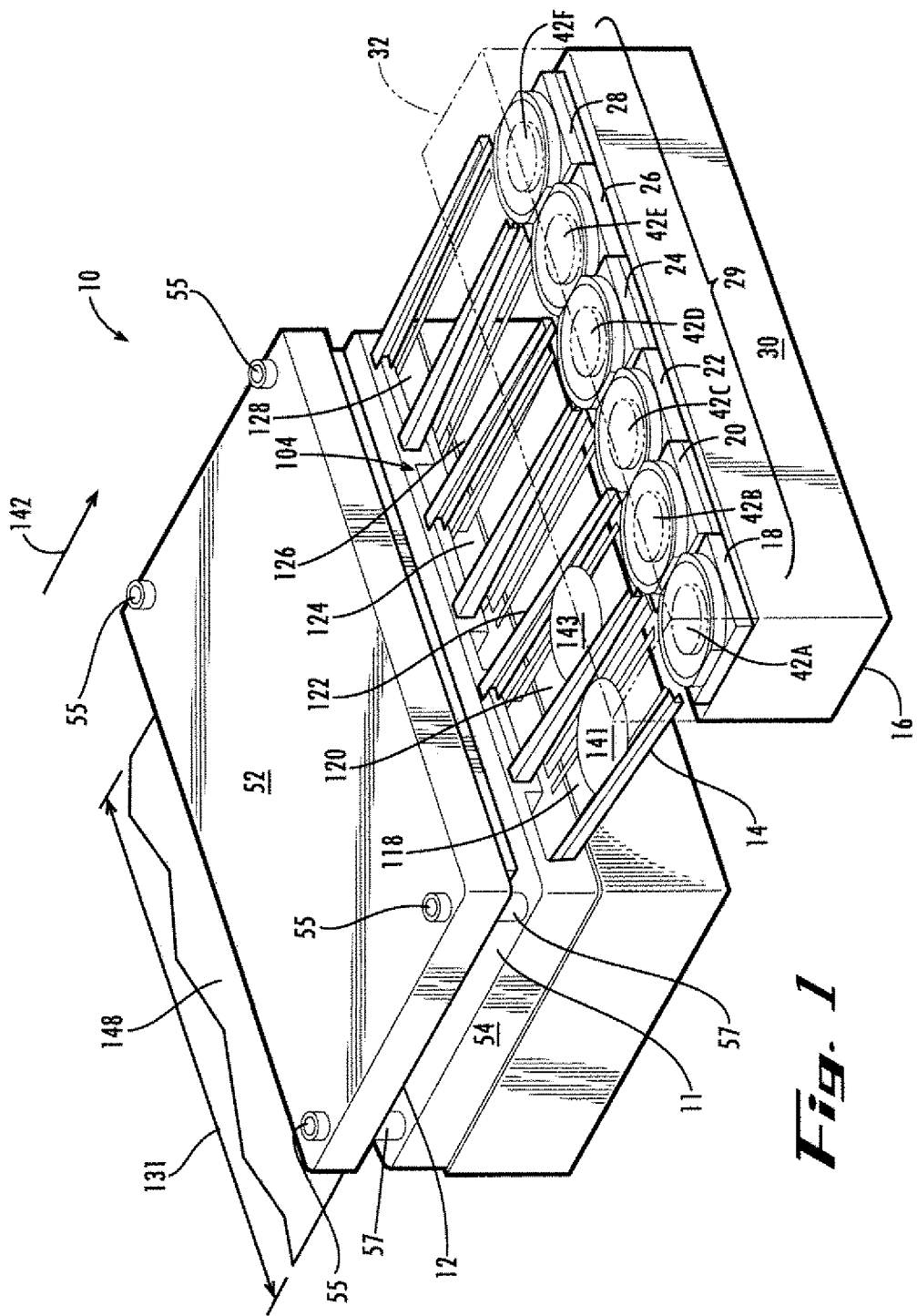
FIG. 1 is a schematic layout showing a forming press for producing pressware from a paperboard web utilizing a pressware forming tool arranged in a cross-direction.

The invention is described in detail below with reference to the drawings. Such explanation is for purposes of illustration only; modifications to particular examples and layouts within the spirit and scope of the invention, set forth in the appended claims, will be readily apparent to those of skill in the art.

As used herein, terminology has its ordinary meaning as further supplemented below. For example, "mils" means thousandths of an inch.

"Production direction" refers to the direction in which material and product is advanced during a production process. "Production direction" carries the same definition as "machine direction" as that term is understood by one of ordinary skill in the art.

"Cross-direction" refers to a direction transverse, typically perpendicular, to the production direction substantially in the plane in which product is formed in a forming station. When facing the pressware apparatus, the cross-direction is oriented left to right across the press.

"Cross-directional width" refers to the distance in the cross-direction that a particular item or device extends. For example, cross-directional width of a pressware blank refers to the maximum cross-directional width of the blank that is equal to the diameter of a circular paper board blank, "Collective cross-directional width" is used to refer to the sum of the cross-directional widths of a plurality of individual die pairs (including any clearance spacers between die pairs and to the side frames or other components situated therebetween) that together make up the pressware forming tool.

"Nested pattern" refers to a pattern used on a paperboard web that comprises individual elements offset in the production direction and that exhibit overlapping in the cross-direction as will be apparent from the drawings appended hereto.

"Pressware forming tool" means the plurality of individual die pairs used in the pressware forming apparatus. The inventive pressware forming tool of the present invention includes at least one narrowed die pair.

A "segmented punch" or a "segmented die" refers to the respective forming portions of an individual die pair (forming tools) wherein adjacent parts are configured such that they reciprocate independently over at least a portion of a forming stroke during a pressing operation. Typically, the upper portion (i.e., punch) of an individual die pair can include an outer pressure ring, while a lower or forming portion (i.e., die) of an individual die pair can include an outer draw ring as will be apparent from the discussion and drawings that follow.

The "forming region" of an individual die pair is the region between the punch portion and the forming portion of the die pair. The "forming region height" and like terminology refers to the height of the die pair in an open position as is illustrated in the drawings.

"Paperboard web" is used for convenience because generally one paperboard web is used in the optional scoring, blanking and forming processes and apparatus of the present invention. However, as discussed elsewhere herein, in some aspects, 2 or more paperboard webs can be blanked, optionally scored and formed using the processes and apparatus of the present invention.

In one aspect of the present invention, at least one paperboard web is fed to a press blanking die station where it can be cut into blanks (or a stack of blanks) that are each, independently, transferred to respective forming die pairs via a conveying system comprising chute pairs. The blanks can optionally be scored prior to blanking to improve formation of pressware. The blanks can be cut from the at least one paperboard web in a nested pattern in order to minimize waste The suitable nested pattern will depend largely on the size and shape of the pressware being formed.

In a significant aspect, the present invention provides a plurality of die pairs that collectively provide the inventive pressware forming tool. In accordance with the present invention, at least one of the die pairs comprises a cross-directional width that is narrower in comparison to the cross-directional widths used in die pairs used in the prior art. Since the pressware forming tool comprises at least one additional die pair, the pressware apparatus of the present invention provides improved efficiencies using a standard width press.

The individual die pairs of the present invention can be lower in height (that is, shorter) than conventional die pairs to allow for a mounting member to be used. Accordingly, the individual die pairs that collectively form the pressware forming tool can be arranged at differing elevations across the cross-directional width of the pressware forming tool. The differing elevations of the individual die pairs can be arranged so that the blanks and guiding conveying system (as are discussed in more detail herein) do not interfere with each other. The at least one narrower and shorter die pairs and accompanying components can be designed in a manner to maintain adequate segment strengths so that failure will not occur under the high pressing forces necessary to form the pressware products.

The pressware forming tool of the present invention can be arranged in a multi-level array. In one aspect, the individual die pairs can be placed in a one up and one down arrangement. Moving from left to right across the press, the first die pair can be lower than the second die pair, the third die pair can then be at approximately the same lower height of the first die pair, the fourth die pair can be approximately at the same height as the second die pair, fifth die pair can be approximately at the same height as the first and third die pairs and the sixth die pair can be at approximately the same height as the second and fourth die pair. Alternatively, the first die pair can be higher and the second die pair lower, with the arrangements being above and below as discussed above. Yet further, the die pairs can be arranged in any suitable arrangement to allow one or more additional die pairs to be placed across the press. While the multi-level arrangement is described in conjunction with a bi-level arrangement, it is contemplated that additional levels can be added to thereby provide other arrangements of inventive pressware forming tool to further improve the efficiencies in accordance with the present invention.

The individual die pairs of the present invention can comprise conventional components such as upper and lower bases, contours, knock-outs, rings, springs, heaters, air assist mechanisms and so forth. Alternatively, improved components can be suitably utilized with the pressware die pairs of the present invention.

One such improved component includes an enhanced ring stop as disclosed in co-pending application entitled "Enhanced Ring Stops" filed concurrently with the present application and which has been assigned. The disclosure of that application is incorporated herein in its entirety by this reference. The enhanced ring stop can be useful in the present invention due to the narrowed aspect of the individual die pairs. That is, since the die pairs are narrowed in the cross-direction, there is generally less material support along these narrowed sides. The extra material (cross-sectional area) provided by the enhanced die stops provide added durability of the die pair to the stresses of imparted in the forming station, which can greatly reduce the need to shut down the press and replace the die pairs. These enhanced rings stops are described further herein.

The pressware forming tool design of the present invention allows for at last one additional die pair to be included in the pressware forming tool within the existing cross-directional width of a standard-sized press. The inclusion of this at least one additional die pair markedly increases production output over what was available in the prior art without having to purchase a larger press. For example, a 57.5 inch width press conventionally includes five nominal 9 inch die pairs installed across the cross-directional width of the press to provide a conventional pressware forming tool. However, using the machinery and methods of the present invention, a standard width press can be adapted to comprise six die pairs to provide the inventive pressware forming tool. This additional die pair can provide, for example, up to about 20% more pressware containers from a pressing operation when the press is operated at the same speed.

Table 1 is a comparison of conventional pressware manufacturing processes for selected pressware products. This Table demonstrates that increased efficiency is provided in accordance with the present invention using the same sized press using the pressware forming tool of the present invention comprising one or more narrowed die pairs.

While the invention is described in Table 1 in relation to 57.5 inch forming stations, it will be appreciated that the invention can be adapted for use in presses having other widths to achieve similar manufacturing advantages.

TABLE 1

Table 1 - Comparison of Invention and Conventional Pressware Manufactured with 57.5 inch Press Typical Dimensions - Current Practice

| Product* | Blank Diameter (Inches) | Die Pair Width (Inches) | # of Die Pairs Across Press Width | Collective Cross-Directional Width Required For Forming Tool (Inches)** (Col 5) | Productivity Increase Per Press at Same Speed (%) | Collective Cross-Directional Width Required to Make Specified # of Blanks (Inches) (Col 7) | Cross-directional Forming Press Efficiency (Col 7/57.5 inches)* 100% |
|---|---|---|---|---|---|---|---|
| 7" Plate | 7.375 | 8.75 | 6 | 52.72 (<57.5) | — | 44.250 | 77.0 |
| 9" Plate | 9.375 | 10.50 | 5 | 52.69 (<57.5) | — | 46.875 | 81.5 |
| 10" Plate | 11.093 | 12.68 | 4 | 50.88 (<57.5) | — | 44.372 | 77.2 |

Typical Dimensions - Invention (Pressware forming tool +1 Die Pair Across Press Width)

| Product* | Blank Diameter (Inches) | Die Pair Width (Inches) | # of Die Pairs Across Press Width | Collective Cross-Directional Width Required For Forming Tool (Inches)** (Col 5) | Productivity Increase Per Press at Same Speed (%) | Collective Cross-directional Width Required to Make Specified # of Blanks (Inches) (Col 7) | Cross-directional Forming Press Efficiency (Col 7/57.5 inches)* 100% |
|---|---|---|---|---|---|---|---|
| 7" Plate | 7.375 | 7.375 | 7 | 51.88 (<57.5) | 16.7 | 51.625 | 89.8 |
| 9" Plate | 9.375 | 9.375 | 6 | 56.47 (<57.5) | 20.0 | 56.250 | 97.8 |
| 10" Plate | 11.093 | 11.093 | 5 | 55.66 (<57.5) | 25.0 | 55.465 | 96.5 |

*Nominal Sizes
**Assumes 1/32" minimum between pressware die pairs and to side frames Surprising efficiencies have been seen with the methods and apparatus of the present invention. For example, productivity increases of from about 15 to about 25% can be realized at the same press speed utilizing one or more narrowed die pairs in the inventive pressware forming tool, This remarkable result is achieved by increasing the cross-directional forming press efficiency of a standard sized press. The cross-directional efficiency can be greater than about 85% or greater, or greater than about 90%, where cross-directional efficiency is the collective diameter of the blanks being pressed at the same time divided by the total operational width of the forming press.

There is provided in one aspect of the invention a pressware apparatus for concurrently producing a plurality of pressware in a forming cycle from a plurality of paperboard blanks supplied thereto along a production direction. The apparatus includes an optional scoring station, a blanking station and a forming station. The forming station comprises a plurality of reciprocating pressware die pairs arranged in the forming station in a cross-direction (i.e., laterally juxtaposed). The die pairs can be situated at a plurality of levels, The individual die pairs can be arranged side by side as opposed to, for example, in stacked or overlapping relationships.

The pressware forming tool comprising the individual die pairs comprises at least one die pair that has an upper limit of cross-directional width of up to about 105% of the cross-directional width of the paperboard blank from which the pressware is prepared. That is, the cross-directional width of the at least one die pair is up to about 5% larger than the diameter of a paperboard blank that is formed into a pressware container in each respective die pair. Still further, the cross-directional width of the at least one die pair is from about 4%, 3%, 2%, 1%, 0% larger than the diameter of a paperboard blank pressed in the die pair, where any value can be used as an upper or lower endpoint, as appropriate.

On the lower end, the pressware forming tool comprises at least one die pair having a cross-direction that is about equal to the cross-directional width of a finished pressware product formed in the die pair.

With smaller diameter pressware containers, that is, pressware having diameters of from about 6 to about 11 inches or from about 7.5 to about 10 inches, die pairs having a cross-directional width of up to about 110% of the paperboard blank supplied thereto can be used.

The individual die pairs comprising the pressware forming tool of the present invention can be generally identical in size and configuration to each other. Still further, the die pairs can be varied in size and configuration as long as at least one of the die pairs is configured to provide an additional die pair in the pressware forming tool of the present invention, where the pressware forming tool is usable in a standard-sized pressware forming apparatus.

Each of the individual die pairs can comprise an upper punch forming portion and a lower die forming portion defining therebetween the forming region of the die pair. One particularly convenient way of arranging the individual die pairs is by interposing a plurality of mounting members of substantially equal thickness between the individual die pairs in the forming station between opposite forming portions of adjacent die pairs in the pressware forming tool and the forming station. A first die pair can then have a first mounting member between the punch of the first die pair and the forming station adjacent to a second die pair having a second mounting member between the die of the second die pair and the forming station. This arrangement is illustrated in FIG. 7, for example.

Alternately, individual die pairs having different forming heights as measured from their lowermost extremities can be used in order to form a multi-level arrangement in the invention. While any convenient configuration can be used for the individual die pairs, one or both of the forming portions of the die pairs can be segmented and can include, for example, an outer annular ring such as a pressure ring or a draw ring.

The reciprocating portions of at least one of the die pairs of the plurality of die pairs comprising the pressware forming tool can be shortened in the cross-direction (as compared to prior art die pairs) such that the at least one die pair is longer in the production direction than in the cross-direction. Such narrowed die pairs can nevertheless be used to produce pressware having a circular perimeter.

The die pairs can each, independently, include a segmented lower forming profile having a draw ring at the outer forming portion of the forming profile that is narrowed in the cross-direction such that the draw ring is longer in the production direction than in the cross-direction. The punch portion of the die pair can include a pressure ring having essentially the same geometry. The narrowed portion of the outer rings of the at least one die pair can have a linear portion along the production direction or any other suitable configuration.

The present invention is suitably used in connection with heated die pairs inasmuch as the paperboard blanks generally require elevated temperatures in order to be durably molded into the desired shape.

In another aspect of the invention, there is provided a die pair having a punch portion with a unitary forming member for defining a forming surface corresponding to the bottom, sidewall, and brim of a container wherein the punch portion is provided with means for pneumatically removing formed product from the pressware forming tool. This aspect of the invention is disclosed and claimed in U.S. patent application Ser. No. 11/451,057, filed Jun. 12, 2006, which disclosure is incorporated herein in its entirety by this reference. When used in the present invention, the pneumatic removal of a formed pressware can significantly reduce the number of moving parts necessary in the die pairs and utilizes compressed air, for example, to promote reliability and advance the blanks and product throughout the system. When this arrangement is used, the die pair can have a forming profile with a removable contour having a tapered undercut to cooperate with a tapered annular projection on a draw ring of the forming profile.

In one aspect, the blanking station can be adapted to cut a nested array of paperboard blanks from a web supplied thereto. The press can further be adapted to score the blanks prior to pressing. The blanking station can have a multi-level feeder for supplying the paperboard blanks to the multi-level blank conveying system, which is generally known in the art as a "bridged blanking die." Such a design (See, for example, FIGS. 1, 2, 4C) can be utilized such that the blanking apparatus delivers the blanks at two or more separate levels into the respective chute pairs.

Figure 2:
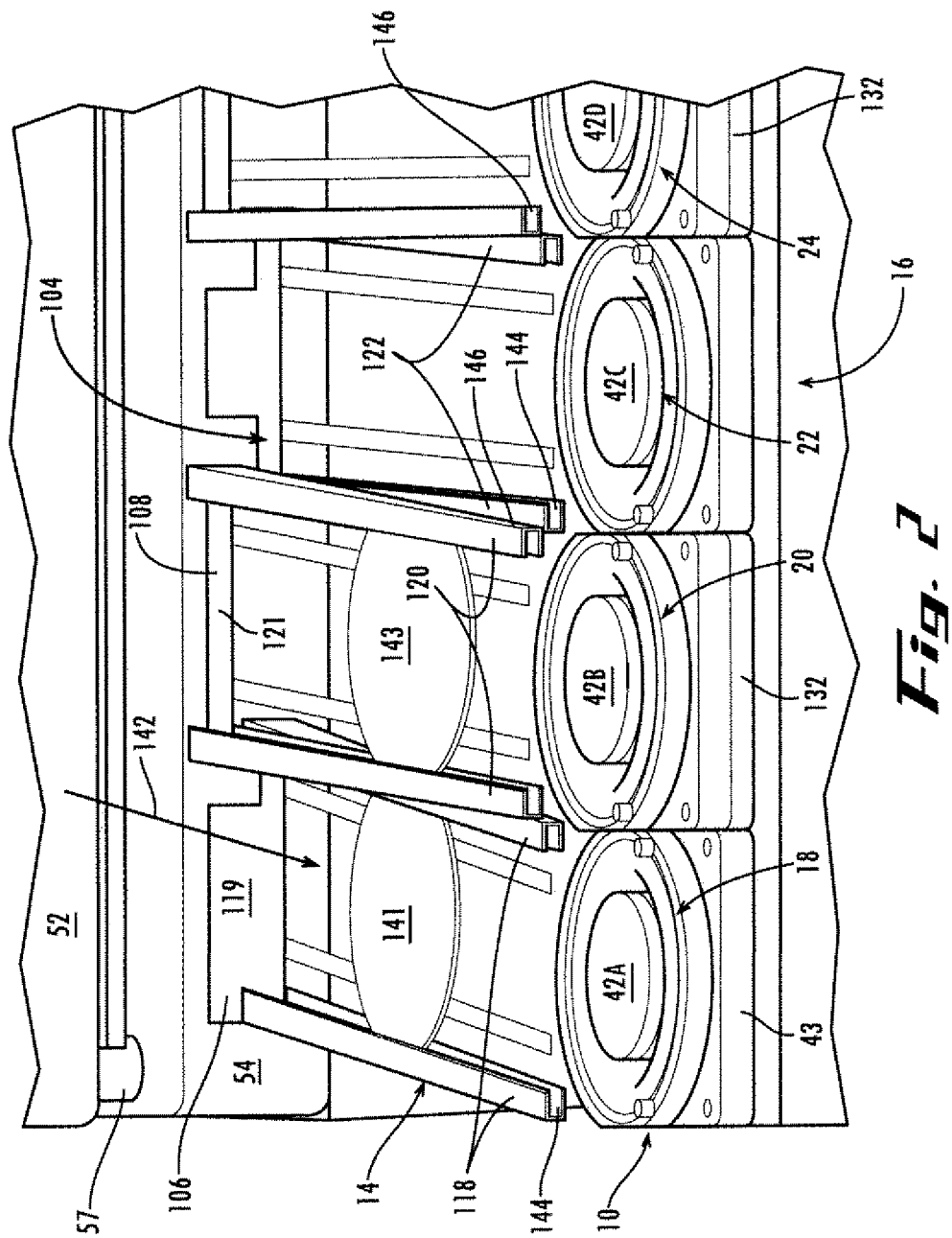
FIG. 2 is an enlarged schematic layout showing the feeder from a blanking station to a conveying system that transfers the blanks to die pairs arranged in a multi-layer array according to the invention.

The conveying system can comprise one or more levels such that the blanks are directed from the blanking station at different levels. For example, when a bridged blanking apparatus is used, the blanks can exit the blanking station at different levels, that is, higher and lower as shown in FIG. 2, items 119 and 121, which are the first and second feeder slots, respectively. The chute pairs 118 and 120 that convey blanks 141 and 143 to the respective die pairs 42A and 42B can be wider at the place where the blanks 141 and 143 exit feeder slots 119 and 121 and the chute pair 118 that conveys blank 141 from first feeder slot 119 to die pair 42A can be situated such that there is overlap between the first chute pair 118 and second chute pair 120. This overlap can continue across the cross-directional width of the conveying system to allow the blanks to be efficiently conveyed to the respective die pairs.

Still further, the chute pairs comprising the conveying system need not be overlapping across the cross direction thereof as long as it is possible to efficiently direct the blanks from the blanking station to the respective die pairs for forming of pressware therefrom. As would be understood by one of ordinary skill in the art, the placement of the chute pairs in the conveying system will be largely dependent on the location of the feeder slots in the blanking die and the arrangement of the die pairs (up and down as well as left to right) across the forming press width.

The individual chute pairs comprising the conveying system that transfers the blanks from the blanking station to the respective individual die pairs are typically made in a U-shape as will be seen from the drawings. These guide rails can be spaced apart with some clearance relative to blank diameter such as to allow the blank to be gravity fed to the respective die pairs. The clearance can be from about $1/32$ to about $1/8$ inch. In some aspects, the chute pairs would not have enough space to fit in next to each other with this clearance if they were on the same elevation. Accordingly, spacers can be added to every other die pair to stagger their elevation so that the rails can also be staggered.

In one aspect, the conveying system can comprise an alternating multi-level array of gradually narrowing gravity fed chute pairs, where the distance between the chute pairs is narrower closest to the feeder slots and becomes wider in the machine direction. This is illustrated, for example, in FIGS. 1 and 2.

Still another aspect of the invention comprises utilizing a plurality of pressware blanks having a collective cross-directional width of at least about 85% of the cross-directional width of the forming press. The collective cross-directional width in % can also be thought of as the % efficiency (Table 1, column 7 above). Cross-directional % efficiencies of about 87.5%, 90%, 92.5%, 95% or more are readily achieved with the invention.

In a still further aspect of the invention, a conventional blanking station can be modified to process additional widths of a paperboard web by, for example, resizing the male guide pins and relocating female bushings of the blanking station. For example, a conventional blanking station can utilize a paperboard web having a width of up to about 80% of the press width or so in a conventional operation. The size limitation is a result of the area needed by the conventional blanking apparatus, male pin size and female bushing mounting location between the upper punch and lower die shoes that span the cross-directional width of the paperboard web. Accordingly, using conventional blanking apparatus, about 20% of the cross-directional area of a paperboard web is lost as waste. By mounting the female bushings on an external surface of a reciprocating punch shoe and marginally decreasing the male pins from about 2.5 inches to about 2 inches, for example, the web width can be increased from about 85% or so up to about 87.5 or even about 90% of the blanking press width. This allows a wider web to be used to thereby providing greater efficiencies.

The external placement of bushings is well-illustrated in FIGS. 1 and 4A. In FIG. 4A dotted line L represents the placement of the exterior mounted bushing (not shown) around pin 57, If the bushing were conventionally placed within the punch shoe 52 and die shoe 54 of the blanking station 10, web 11 would hit blank location 68. Put simply, if the bushing were conventionally placed within punch shoe 52 and die shoe 54 of the forming press 10, there would not be enough clearance for web 11 to obtain 6 blanks 68, 70, 72, 74, 76 and 78 so as to utilize the additional die pair present in the inventive pressware forming tool 29. As such, it is believed by the inventors that the exterior placement of the bushings of the blanking station is a signification improvement over the prior art.

Alignment pins 57 (as shown in FIG. 1) having a reduced diameter can also be used. For example, conventionally 2.5 inch pins are used. However, to optimize the number of blanks that can be prepared from a web, the pin diameter can be reduced to, for example, 2 inches.

In a further aspect of the present invention, 2 or more paperboard webs can be optionally scored, blanked and pressed in single respective operations using the top or otherwise externally mounted bushings, conveying system and/or one or more narrowed die pairs described herein. Suitably, from 2 to up to about 5, paperboard webs can be fed into a blanking station at a single time to provide a stack of blanks for further processing. The stack can optionally be scored prior to blanking. The optionally scored paperboard blanks can then travel through the conveying system to the inventive pressware forming tool of the present invention for pressing into pressware using the one or more narrowed die pairs described herein. In this aspect, about 2 or more pieces of pressware can be simultaneously prepared in a single optional scoring, blanking and pressing operation. Although forming of multiple blanks in a single pressing operation will likely not form pleats having the same structural integrity as pleats formed from pressing a single blank, when pressware comparable to "economy plates" or "white no print plates" are desired, the pleat quality will be suitable using the apparatus and processes of the present invention. Dies can have a fluted profile to take up material, instead of providing pleats in the finished product.

Prior to the present invention, an extra die pair could not be installed for 6 across forming in a 5 across standard width press. For example, a current 9 inch nominal diameter plate die pair (5 across in a 57.5 inch wide forming press) has a die pair width of about 10½ inches and some additional distance, $\frac{1}{32}$" or more is generally present between individual die pairs and between the end die pairs and the side frames of the press. This utilizes a total of about 52.7 inches of the total width, Clearly, a 6th die pair would not fit. In accordance with the present invention, one or more of the individual die pairs tool can be narrowed in the cross-direction, for example from 10.5 inches to about the diameter of the blank or about 9⅜ inches.

Suitably, a minimal clearance (for example, about $\frac{1}{32}$ inch) is required between the individual die pairs and between the end die pairs and the side frames of the press. 9⅜.times.6 die pairs plus about 0.2 inches for clearance is a total of about 56.5 inches which is within the cross-directional width of the 57½ inch press such that the extra die pair is readily accommodated in the press in accordance with the invention. In some aspects, the clearance between the die pairs and clearance between the end die pairs and press side frames can be about $\frac{1}{16}$ inch and in some cases clearances of about ⅛ inch and more can be used.

The narrowed die pair design of the present invention can be used to prepare a nominal 9 inch plate is narrowed from a conventional 10½ inch to about 9⅜ inch to allow for six across forming in accordance with the present invention. The forming die pair closed height can also be decreased about ¾ inch so that an about ¾ inch spacer could be used at every die pair.

An alternative narrowed die design that can be used in the present invention includes only one moving part (one ring—draw ring only) as compared to segmented forming die pairs. This aspect is pictured in FIGS. 16, 17 and 18.

The inventive narrowed die pair can include flat or linear portions on the draw and pressure rings and an added continuous enhanced stop system to one or both of the rings, therefore eliminating the need for separate parts and providing reinforcement from thinner areas in the cross direction of the ring. Decreasing thicknesses and moving mounting hardware can also be employed to reduce the forming die height (closed) by about ¾ inch while maintaining adequate strengths for each of the sections as will be appreciated from the discussion that follows. If so desired, a die pair having a total width of no more than about the paperboard blank diameter can have a spring loaded moving draw ring situated around the lower die of the die pair, which is positioned through an enhanced 360' stop ring (that is, extending around the entire circumference of the punch and/or forming profile) and which bears upon an angled ledge of a removable contour. This 360.degree. stop ring can be angled or horizontal as set forth in detail in U.S. application Ser. No. 11/465,697, now U.S. Pat. No. 8,734,309, entitled, "Enhanced Die Stops," filed concurrently herewith and previously incorporated by reference.

Still further, 3 or more individual angled stops (that is, having an angle of from about 1.degree. to about 179.degree., but not about 90.degree.) that are distributed around the punch and or forming profile can be used. This aspect of the present invention is further described in the previously referenced and incorporated "Enhanced Die Stops" application. As described therein, it has been found that increasing the amount of surface area can greatly improve the durability of the individual die pairs, in particular, when material has been removed from the individual die pairs to provide the one or more narrowed die pairs of the present invention. Still further, the die stops used in the present invention can be co-radial as described in the "Enhanced Die Stops" application.

The draw ring can be prevented from substantially rotating through the use of a plurality of keys (for example, from about 3 to about 10) mounted on the lower die.

The upper portion of the die pair can comprise a one piece punch that utilizes a series of air holes in the face of the forming profile to eject the formed pressware. The upper portion of the die pair can also comprise a standard punch with a pressure ring that can be ejected from the upper portion of the die pair, for example, using an air assist nozzle mounted to the upper die pair portion.

Further details are appreciated by comparing Tables 2 and 3. Table 2 provides details on conventional pressware manufacturing, while Table 3 provides dimensions and relative efficiency for the inventive system.

It is seen by comparing Tables 2 and 3 that the inventive manufacturing system increases throughput by increasing the cross-directional efficiency of a standard width press. Further features and advantages are appreciated by considering the various drawings appended hereto.

TABLE 2

Pressware Blank Web & Die Dimension Summary:

Typical Dimensions - Current Practice (57.5 inch press width)

| Product* | Blank Diameter (Inches) | Roll Width@ (Inches) | Press Width Used for Forming (Inches)@@ | # of Die Pairs Across Press Width | Typical Die Pair Width (Inches) |
|---|---|---|---|---|---|
| 6" Plate | 6.188 | 34.031 (<40) | 46.0 | 6 | 7.25 |
| 7" Plate | 7.375 | 40.625 (<51.5) | 57.5 | 6 | 8.75 |
| 9" Plate | 9.375 | 42.625 <51.5) | 57.5 | 5 | 10.5 |
| 10" Plate | 11.093 | 41.156 (<51.5) | 57.5 | 4 | 12.68 |
| 11" Plate | 12.000 | 44.094 (<51.5) | 57.5 | 4 | 12.88 |
| 5 oz Bowl | 6.188 | 34.031 (<40) | 46.0 | 6 | 7.25 |
| 12 oz Bowl | 7.727 | 40.625 (<51.5) | 57.5 | 6 | 8.75 |
| 20 oz Bowl | 9.375 | 42.625 <51.5) | 57.5 | 5 | 10.5 |
| 7" × 9" Oval Platter | 7.500 × 9.875 | 41.281 (<51.5) | 57.5 | 6 | 8.94 |
| 9" × 11" Oval Platter | 9.621 × 12.000 | 44.312 (<51.5) | 57.5 | 5 | 10.88 |

Typical Dimensions - Current Practice 57.5 inch press width

| Product* | Collective Cross-directional Width Required Forming Tool (Inches)** | Collective Cross-direction Width Required for Forming Tool + 1 die pair (Inches)** using standard width die pair | Collective Cross-directional width required for to make specified number of blanks (Inches) (Col 4) | Cross-directional Forming Press Efficiency (col. 4/57.5 inches)* 100 |
|---|---|---|---|---|
| 6" Plate | 43.72 (<46.0) | 51.00 (>46) TOO WIDE | 37.128 | 80.7 |
| 7" Plate | 52.72 (<57.5) | 61.51 (>57.5) TOO WIDE | 44.250 | 77.0 |
| 9" Plate | 52.69 (<57.5) | 63.22 (>57.5) TOO WIDE | 46.875 | 81.5 |
| 10" Plate | 50.88 (<57.5) | 63.59 (>57.5) TOO WIDE | 44.372 | 77.2 |
| 11" Plate | 51.68 (<57.5) | 64.59 (>57.5) TOO WIDE | 48.000 | 83.5 |
| 5 oz Bowl | 43.72 (<46.0) | 51.00 (>46) TOO WIDE | 37.128 | 80.7 |
| 12 oz Bowl | 52.72 (<57.5) | 61.51 (>57.5) TOO WIDE | 46.362 | 80.6 |
| 20 oz Bowl | 52.69 (<57.5) | 63.22 (>57.5) TOO WIDE | 46.875 | 81.5 |
| 7" × 9" Oval Platter | 53.86 (<57.5) | 62.84 (>57.5) TOO WIDE | 45.000 | 78.3 |
| 9" × 11" Oval Platter | 54.59 (<57.5) | 65.50 (>57.5) TOO WIDE | 48.105 | 83.7 |

Notes:
*Nominal Sizes
@Max Roll Width in Blanking Die is ~40" (46" wide press) and ~51.5" (57.5" press) due to Pins & Bushings
@@Inside Dimensions side frame to side frame
**Assumes 1/32" minimum between pressware die pairs and to side frames

TABLE 3

Typical Dimensions - Invention (+1 Die Pair Across Press Width)

| Product* | Blank Diameter (Inches) | Roll Width@ (Inches) | Press Width Used for Forming (Inches)@@ | # of Die Pairs Across Press Width | Inventive Die Pair Width (Inches) |
|---|---|---|---|---|---|
| 6" Plate | 6.188 | 39.906 (<40) | 46.0 | 7 | 6.18 |
| 7" Plate | 7.375 | 47.156 (<51.5) | 57.5 | 7 | 7.38 |
| 9" Plate | 9.375 | 51.250 (<51.5) | 57.5 | 6 | 9.38 |
| 10" Plate | 11.093 | 51.000 (<51.5) | 57.5 | 5 | 11.09 |
| 11" Plate | 12.000 | 54.938 (>51.5) TOO WIDE | 57.5 | 5 | 12.00 |
| 5 oz Bowl | 6.188 | 39.906 (<40) | 46.0 | 7 | 6.18 |
| 12 oz Bowl | 7.727 | 47.156 (<51.5) | 57.5 | 7 | 7.75 |
| 20 oz Bowl | 9.375 | 51.250 (<51.5) | 57.5 | 6 | 9.38 |
| 7" × 9" Oval Platter | 7.500 × 9.875 | 48.000 (<51.5) | 57.5 | 7 | 7.50 |
| 9" × 11" Oval Platter | 9.621 × 12.000 | 52.844 (>51.5) TOO WIDE | 57.5 | 6 | 9.62 |

TABLE 3-continued

Typical Dimensions - Invention (+1 Die Pair Across Press Width)

| Product* | Collective Cross-directional Width Required for Forming Tool (Inches)** | Collective Cross-direction Width Required for Forming Tool + 1 die pair (Inches)** using standard width die pair | Collective Cross-directional width required for to make specified number of blanks (Inches) (Col 4) | Cross-directional Forming Press Efficiency (col. 4/57.5 inches)* 100 |
|---|---|---|---|---|
| 6" Plate | 43.52 (<46.0) | 16.7 | 43.316 | 94.2 |
| 7" Plate | 51.92 (<57.5) | 16.7 | 51.625 | 89.8 |
| 9" Plate | 56.50 (<57.5) | 20.0 | 56.250 | 97.8 |
| 10" Plate | 55.64 (<57.5) | 25.0 | 55.465 | 96.5 |
| 11" Plate | 60.19 (<57.5) TOO WIDE | N/A TOO WIDE | 60.000 | 104.3 (TOO WIDE) |
| 5 oz Bowl | 43.52 (<46.0) | 16.7 | 43.316 | 94.2 |
| 12 oz Bowl | 51.92 (<57.5) | 16.7 | 54.089 | 94.1 |
| 20 oz Bowl | 56.50 (<57.5) | 20.0 | 56.250 | 97.8 |
| 7" × 9" Oval Platter | 52.76 (<57.5) | 16.7 | 52.500 | 91.3 |
| 9" × 11" Oval Platter | 57.94 (>57.5) TOO WIDE | N/A TOO WIDE | 57.726 | 100.4 (TOO WIDE) |

Notes:
*Nominal Sizes
@Max Roll Width in Blanking Die is ~40" (46" wide press) and ~51.5" (57.5" press) due to Pins & Bushings
@@inside Dimensions Side Frame to Side Frame
**Assumes 1/32" Minimum between pressware die pair and to side frames The pressware of the present invention can be in the form of a bowl, plate, oval, deep dish, compartmented plate, multi-sided plate or otherwise. A plate typically has a height to diameter ratio of from about 0.06 to about 0.12, while a bowl or deep dish container has a height to diameter ratio of from about 0.1 to about 0.3.

Typically, pressware according to the invention can have a caliper of from about 8 to about 40 mils. In most cases, the caliper will be at least about 12 mils such as from about 12 to about 25 mils. The containers can have a caliper of at least about 15 mils and are provided with a coating comprising a clay pigment.

The containers can have a plurality of circumferentially spaced, radially extending pleats, disposed at an annular arrangement, which pleats include a substantially integrated fibrous structure formed from a plurality of rebonded paperboard lamellae generally extending over the length of the pleat. The pleats can alternatively include a substantially integrated fibrous structure formed from a plurality of rebonded paper lamellae extending over at least a portion of their length; at least a majority of the pleats should have this feature. While any suitable configuration can be employed, a typical container of the invention can have anywhere from about 25 to about 80 radially extending pleats. From about 30 to about 50 pleats is typical; for example a 9 inch plate can have about 40 radially extending pleats.

Referring to FIGS. 1 through 6 there is shown schematically a forming station 10 arranged in accordance with the present invention. Forming station 10 includes scoring station 12 and blanking station 11 and as well as a conveying system 14 and a forming station 16. Forming station 16 comprises a plurality of die pairs 18, 20, 22, 24, 26 and 28. The plurality of die pairs comprises the inventive pressware forming tool 29. The die pairs are disposed between a lower press platen 30 and an upper press platen 32. Upper press platen 32 is typically movable and lower press platen 30 is typically stationary. For purposes of illustration, FIG. 1 shows the upper platen in phantom lines, whereas FIG. 2 shows only the forming profiles i.e., the lower forming profiles of the die pairs disposed on lower platen 30 of forming station 10 in forming station 16. As discussed previously, FIG. 1 shows exterior mounted alignment bushings 55 and engaged pin 57.

Figure 3:
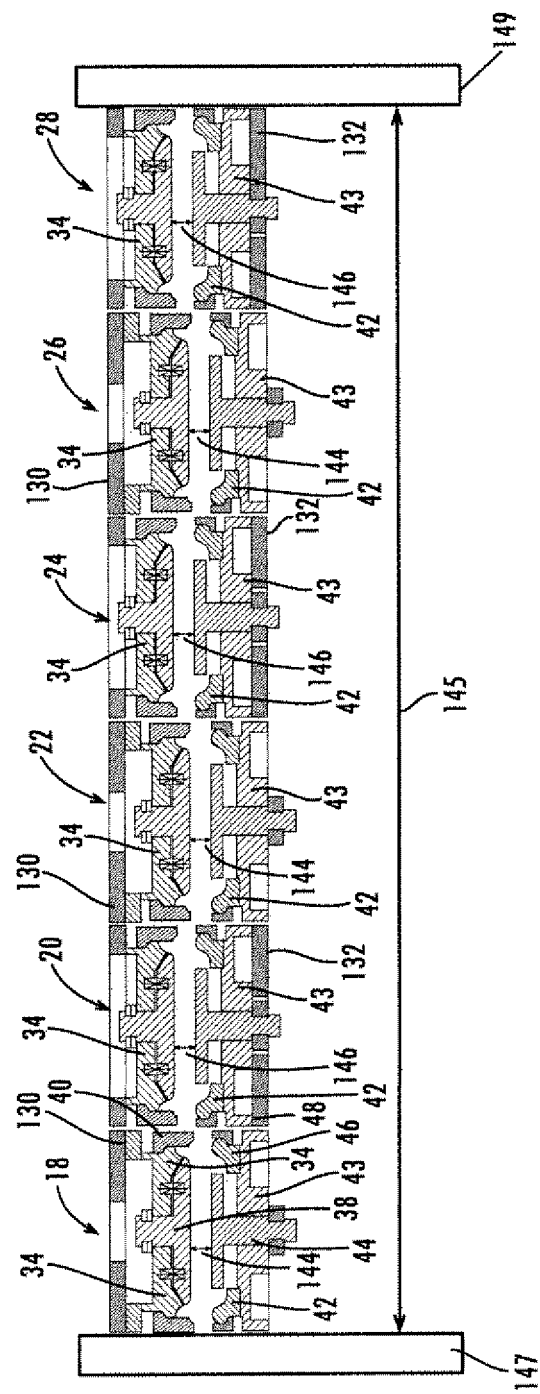
FIG. 3 is a schematic layout showing six individual die pairs arranged in a multi-layer array in accordance with the invention.
Figure 5:
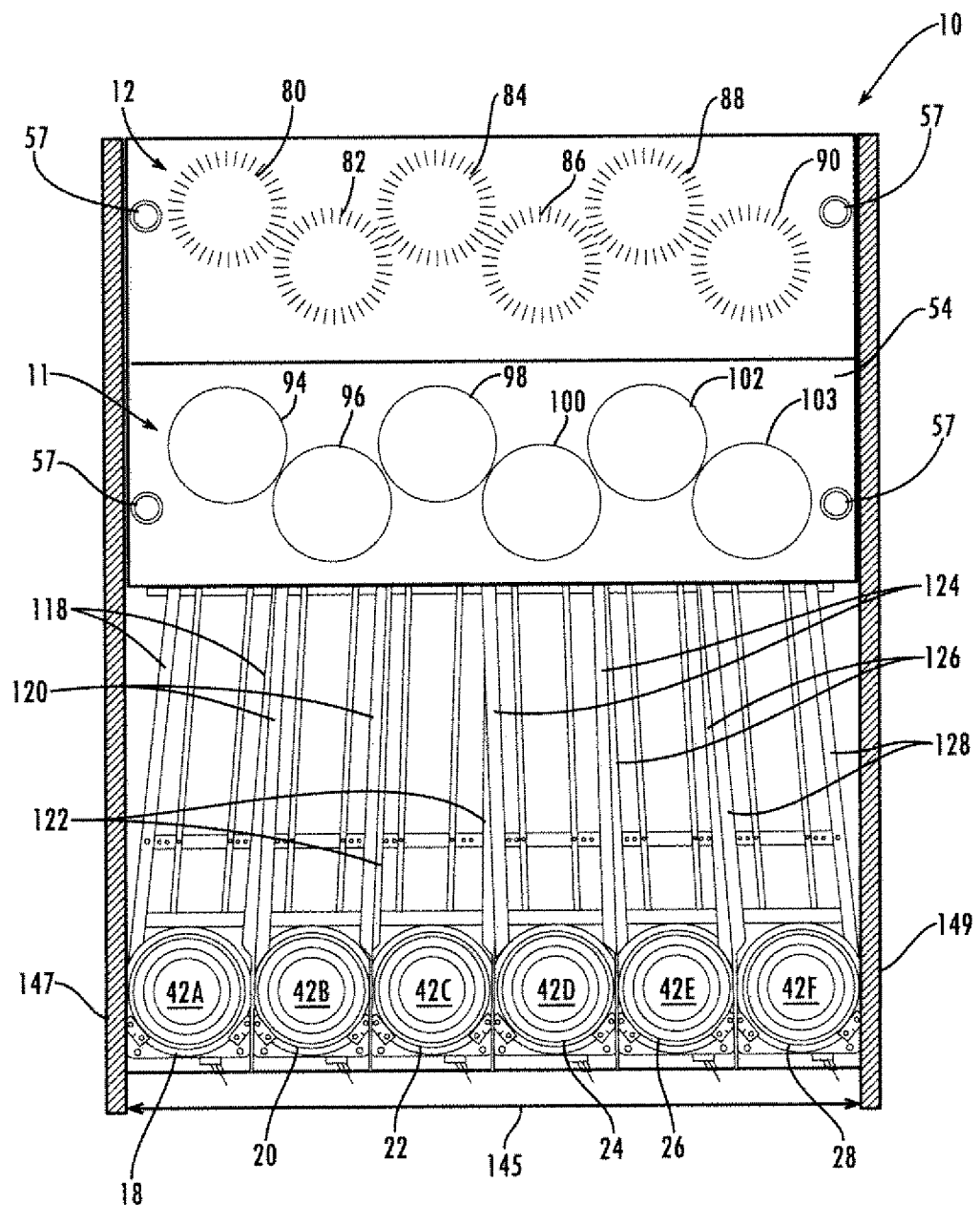
FIG. 5 is a schematic layout of one configuration of the manufacturing system as viewed from the top.
Figure 1:
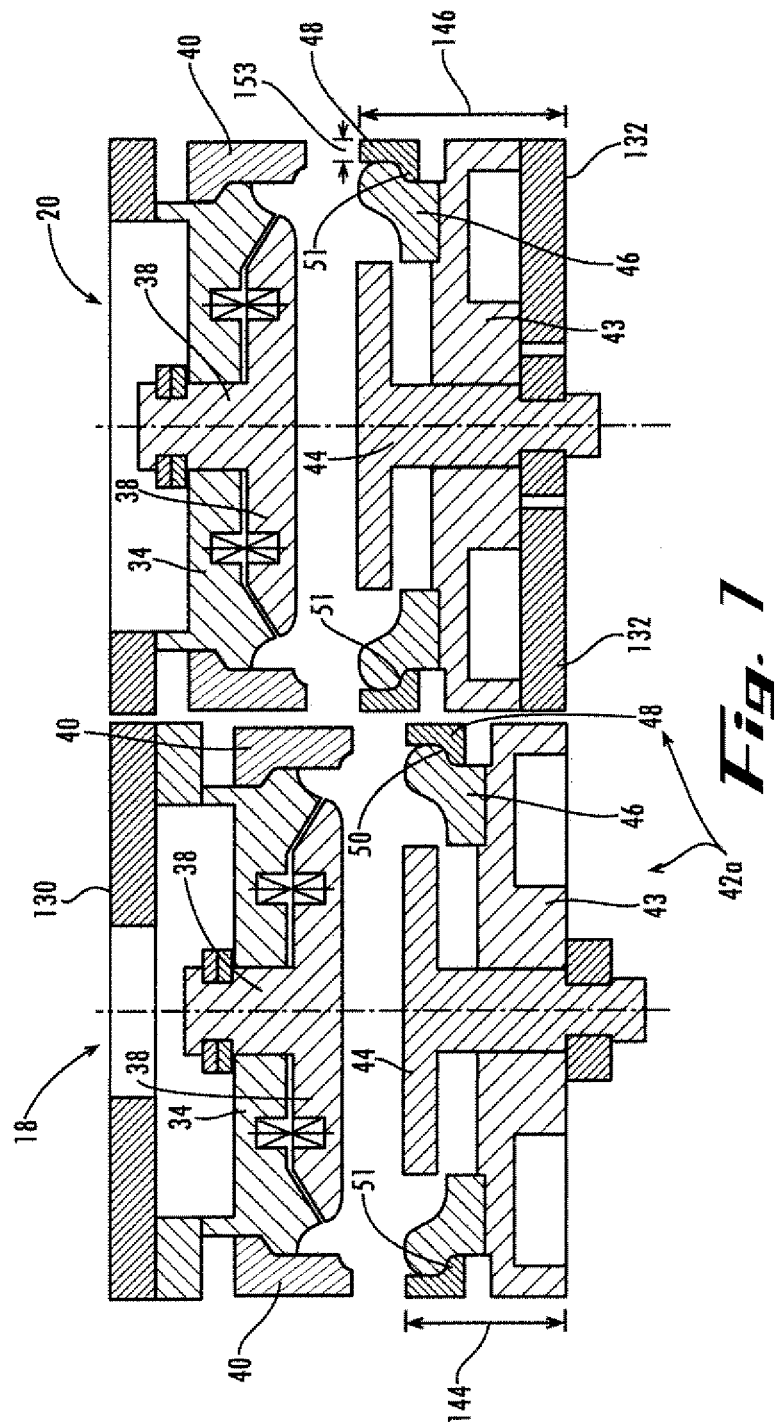

A cross-section of a pressware forming tool is shown schematically in FIG. 3 and are disposed between the platens as noted above.

Each of the die pairs 18, 20, 22, 24, 26 and 28 include generally a punch portion 34, a knock out such as articulated knock out 38 and a pressure ring such as pressure ring 40. The die pairs also include a lower forming profile such as a forming profile 42 that includes generally a die base 43, as well as a central knock-out 44, a removable contour portion 46 and a draw ring 48.

The die pairs shown in FIG. 3 are known in the art as segmented die pairs. As is also known in the art, the die pairs reciprocate between an open position and a closed position in order to form pressware from a paperboard blank.

The lower forming profile 42 can include a removable contour such as removable contour 46 provided with an undercut 50 for retaining the draw ring 48. This feature will be discussed in more detail below.

Referring to FIG. 4A, optional scoring station 12 and blanking station 11 are conveniently arranged in sequence in press 10 on an upper punch shoe 52 and a lower blanking die shoe 54. Punch shoe 52 includes a plurality of scoring rules arranged in circular patterns 56, 58, 60, 62, 64 and 66 as well as male cutting dies 68, 70, 72, 74, 76 and 78.

Referring to FIGS. 1 and 4A, alignment bushings 55 are optionally located on the topside of punch shoe 52, on the opposite side relative to score rules 56, 58, 60, 62, 64 and 66 and male cutting dies 68, 70, 72, 74, 76 and 78.

Referring to FIGS. 4B and 4C, die shoe 54 includes a plurality of score grooves arranged in a nested pattern that correspond to the scoring rules of punch shoe 52, as well as a plurality of female recesses corresponding to the cutting dies of the punch. That is to say, die shoe 54 includes nested score patterns 80, 82, 84, 86, 88 and 90 as well as nested female recesses 94, 96, 98, 100, 102 and 103. Die shoe 54 also has a multi-level bridged feeder 104 for supplying cut blanks to multi-level conveying system 14.

In FIG. 4C, there is shown six feed stations 106, 18, 110, 112, 114 and 116. The feed stations can be arranged in a bi-level array to correspond to a like arrangement of chute pairs 118, 120, 122, 124, 126 and 128 of conveying system 14.

As noted previously, it is contemplated that other layers can be added to suitably extend the ability of a conventionally sized press to provide additional die pairs.

Feeder 104 of die shoe 54 is adjacent to conveying system 14. Conveying system 14 can be arranged in a, for example, bi-level array wherein there are provided six chute pairs 118, 120, 122, 124, 126 and 128. Each of the chute pairs can comprise opposed U-shaped members on its edges that are arranged to correspond to the array of blank feeder 104 as shown in the various diagrams. Thus, first feeder slot 119 of station 106 feeds chute pair 118 at a first inclined level 144 and second feeder slot 121 of station 108 feeds chute pair 120 at a second inclined level 146 and so forth in alternating sequence.

It will be appreciated from FIGS. 1 and 3 in particular, that the die pairs can be generally identical in configuration and are arranged in a multi-level array by utilizing a mounting member alternately placed above and below adjacent pressware die pair as is seen in the diagrams. The mounting members 130 can be of equal thickness.

It can be seen in FIG. 3 for example, that mounting member 130 is placed adjacent to punch portion 34 of die pair 22 and that a mounting member 132 is placed underneath forming profile 42 of die pair 20 so that the overall height of the die pairs with mounting members between the press platens are about equal.

The scoring and blanking press, as well as the conveying system and forming station can be generally inclined along a production direction 142 such that the planar, circular blanks 141, 143 can be advanced by gravity into die pairs 18 and 20.

This configuration is further illustrated in FIG. 6 wherein there is shown die pair 18 and die pair 20 adjacent their corresponding chute pairs 118 and 120 that are located respectively at a first level 144 and a second level 146 of the multi-level arrangement of the die pairs. While any suitable configuration can be employed, it has been found that level 144 is suitably ¾ of an inch or so different from level 146.

In operation of the inventive system, a web of material 148 of width 131 is fed to press 10 along production direction 142. As the web is advanced, the web is optionally scored by the scoring station 12 of press 10 and the scored web is then cut into blanks by cutting station 11 of press 10. The web is thus advanced only a portion of the distance through the press during each press cycle. That is to say, the web is scored in a first cycle and then advanced to the cutting station in a subsequent cycle while additional web surface is being scored. There may be two feeds (cycles) between scoring and blanking.

Following optional scoring and cutting, the paperboard blanks are fed from feeder slot 104 of optional scoring station 12 and blanking station 11 to multi-layer blank conveying system 14 where they are fed by gravity to die pairs 18, 20, 22, 24, 26 and 28. During each press cycle, a set of pressware products are formed at forming station 16. In other words, during each press cycle, each respective station of the forming station concurrently scores, cuts and forms blanks into pressware products. Scoring/cutting and forming are typically 180.degree. apart in the 360.degree. press cycle. That is, the blanks are scored and cut at the same time when the die pairs are open and vice versa. The overall width of conveying system 14 can be maintained because of the multi-level geometry as will be appreciated from the diagrams.

The overall press width 145 (FIGS. 3, 5) is the distance between the side frame members 147, 149. As is seen in the various diagrams, the inventive multi-level arrangement makes it possible to utilize almost the entire press width for production, increasing throughput by 20% and more over conventional techniques.

FIG. 7 is an enlarged schematic view of die pairs 18, 20 each having an upper forming portion or punch 34 including a knock-out 38 and a pressure ring 40. Knock-out 38 is an articulated knock-out in that it is spring loaded to reciprocate in the transverse direction and the outer edges of the knock-out define a portion of the sidewall of the container along with forming portion 34.

Lower forming profile 42 has a die base 43, a knock-out 44, a removable contour 46 as well as a draw ring 48. It will be appreciated from the diagram that removable contour 46 has an undercut 50 which is configured to cooperate with a projection 51 on draw ring 48. The geometry of FIG. 7 provides for extra material in draw ring 48, which can be particularly desirable in the area where the cross-directional width of ring 46 is narrowed as noted above. That is to say, the extra material due to the annular projection 51 provides strength to the draw ring so that the draw ring 48 is additionally durable.

Figure 19:
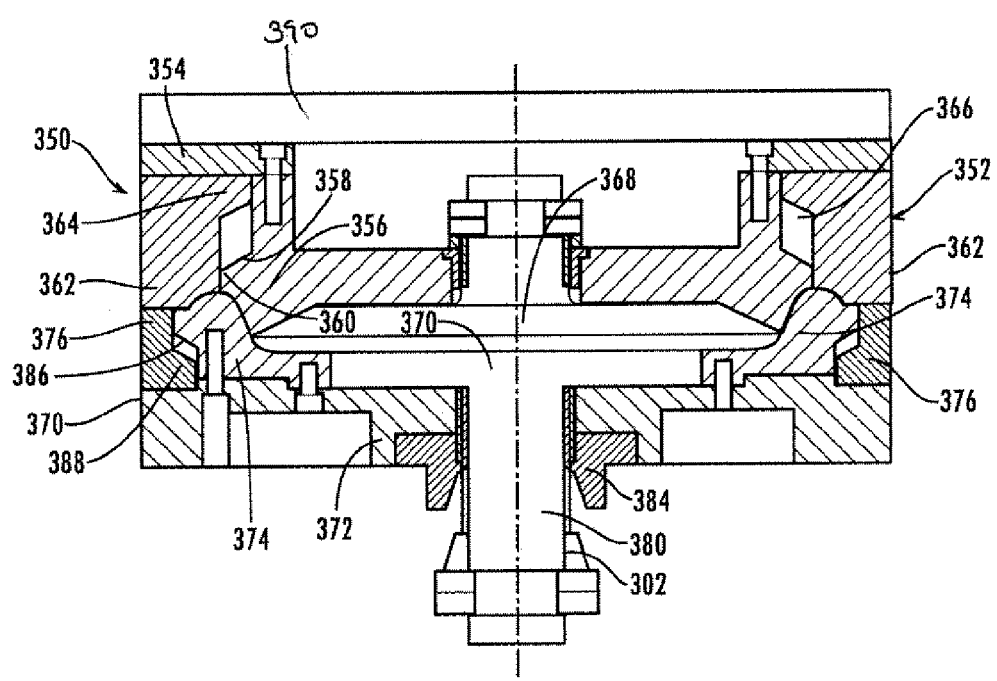
FIG. 19 illustrates a further die pair that can be utilized in accordance with the invention.

Both annular projection 51 and undercut 50 can have tapered geometries. This feature allows material to be added to one or both of the outer rings of the die pairs so that the outer rings have sufficient strength, particularly at their narrowed portions as illustrated in particular in FIG. 5A. The undercut geometry of the contour can likewise be employed in connection with pressure rings, as is seen in FIG. 19, discussed below.

Figure 8B:
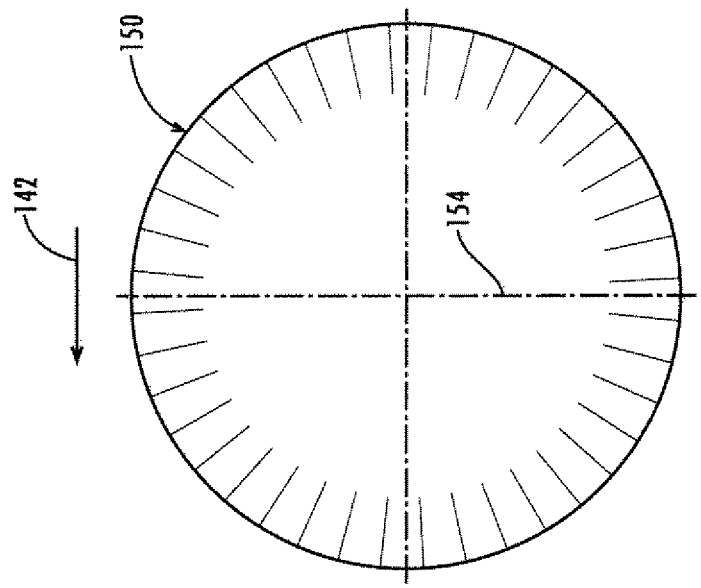
FIG. 8A is a top schematic view illustrated of a lower forming profile of a narrowed die pair and FIG. 8B represents a paperboard blank being fed into the narrowed lower forming profile shown in FIG. 8A.
Figure 8H:
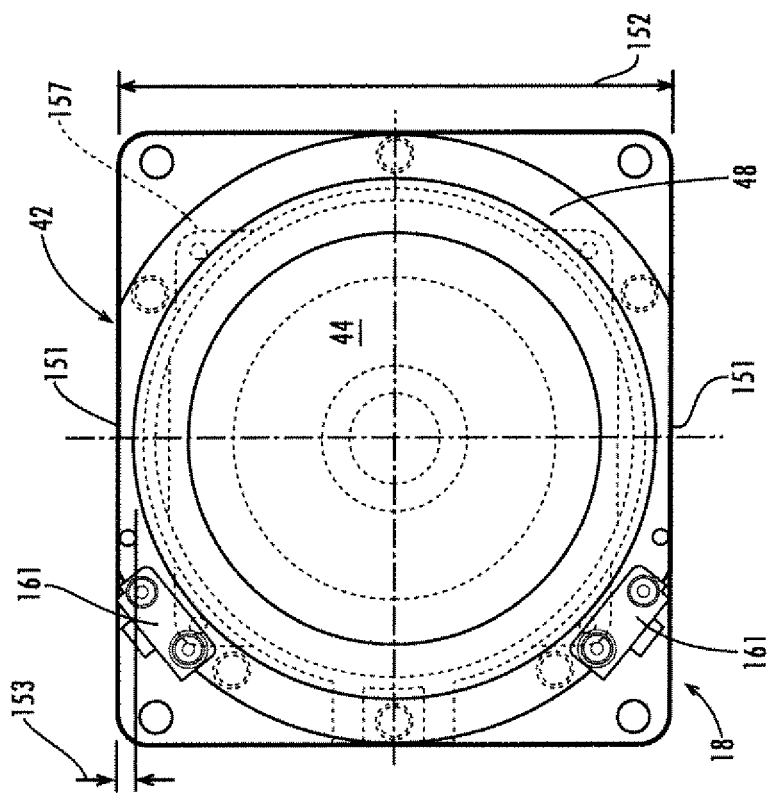

Referring to FIGS. 8A and 8B, it is seen that a cross-directional width 152 of die pair 18 can be about from equal to about 105% of diameter 154 of a paperboard blank 150 which is produced by scoring and blanking web 148. That is to say, width 152 of die pair 18 can be about equal to or up to about 105% of diameter 154 of circular blank 150. The minimum width for die pair 18 can be about equal to the cross-direction of a pressware product prepared from the paperboard blank.

It is also seen in FIG. 8A that draw ring 48 of die pair 18 has a laterally narrowed portion 151 of smaller width than the remainder of the ring. Narrowed portion 151 can have a cross-directional (minimum) width 153 of, for example, 0.32 inches or so for a 9 inch product die pair. This is substantially less than corresponding widths for a conventional die pair that can be more than ¾ inch. Thus, the undercut construction is a salient feature to the narrowed die pair aspect of the present invention because this geometry provides for additional steel in the draw ring which is beneficial since narrowed width 153 is generally only up to about 5% of diameter 154 in accordance with certain forms of the invention.

The die pairs of the invention can comprise heated die pairs and both the punch and forming profiles of the die pairs optionally include cast-in heaters indicated at 157 and blank stops indicated at 161. Such cast in heaters are disclosed in U.S. Pat. No. 6,932,753, which disclosure is incorporated herein in its entirety by this reference.

There is illustrated in FIGS. 9 through 11A a typical pressware product that can be made with the inventive pressware apparatus 10. A plate 170 for example, which has a round perimeter of diameter, D. Plate 170 has a generally planar bottom portion 172, a first annular transition portion 174 and a sidewall portion 176. A second annular transition portion 178 extends between sidewall portion 176 and an arcuate outer flange 186. The sidewall defines a generally linear profile 180 between first annular transition portion 174 and second annular transition portion 178. Sidewall 176, second annular transition portion 178 and flange 186 have a plurality of pleats 189 which preferably correspond to scores of a paperboard blank.

The inclined generally linear profile portion 180 defines an angle of inclination A1 with a vertical 184. Outer arcuate flange portion 186 has a downturned brim configuration with convex upper surface 188 and defines an outer radius of curvature, R3. Outer radius of curvature, R3 is defined by portion 186 over an included angle A2.

Figure 11A:
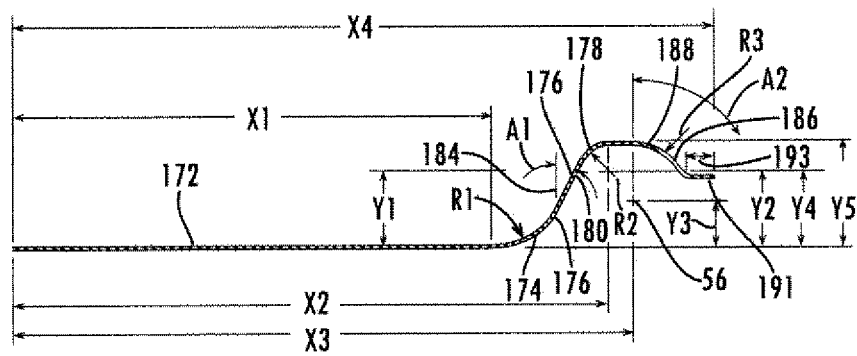
FIGS. 11A and 11B are schematic diagrams illustrating profiles of pressware containers.
Figure 11B:
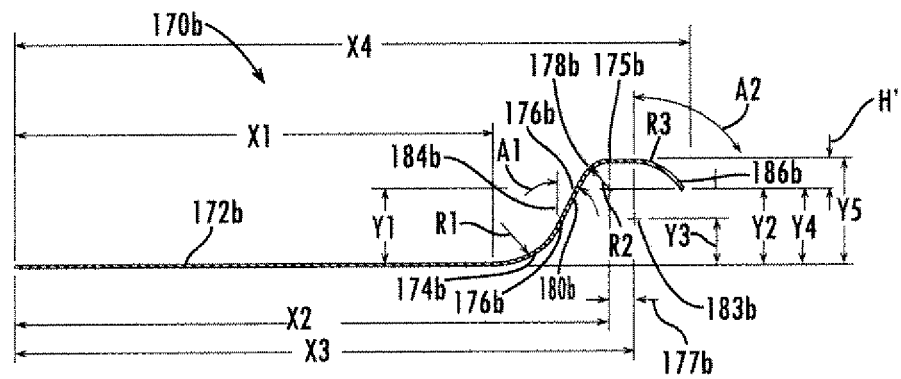
Figure 11:
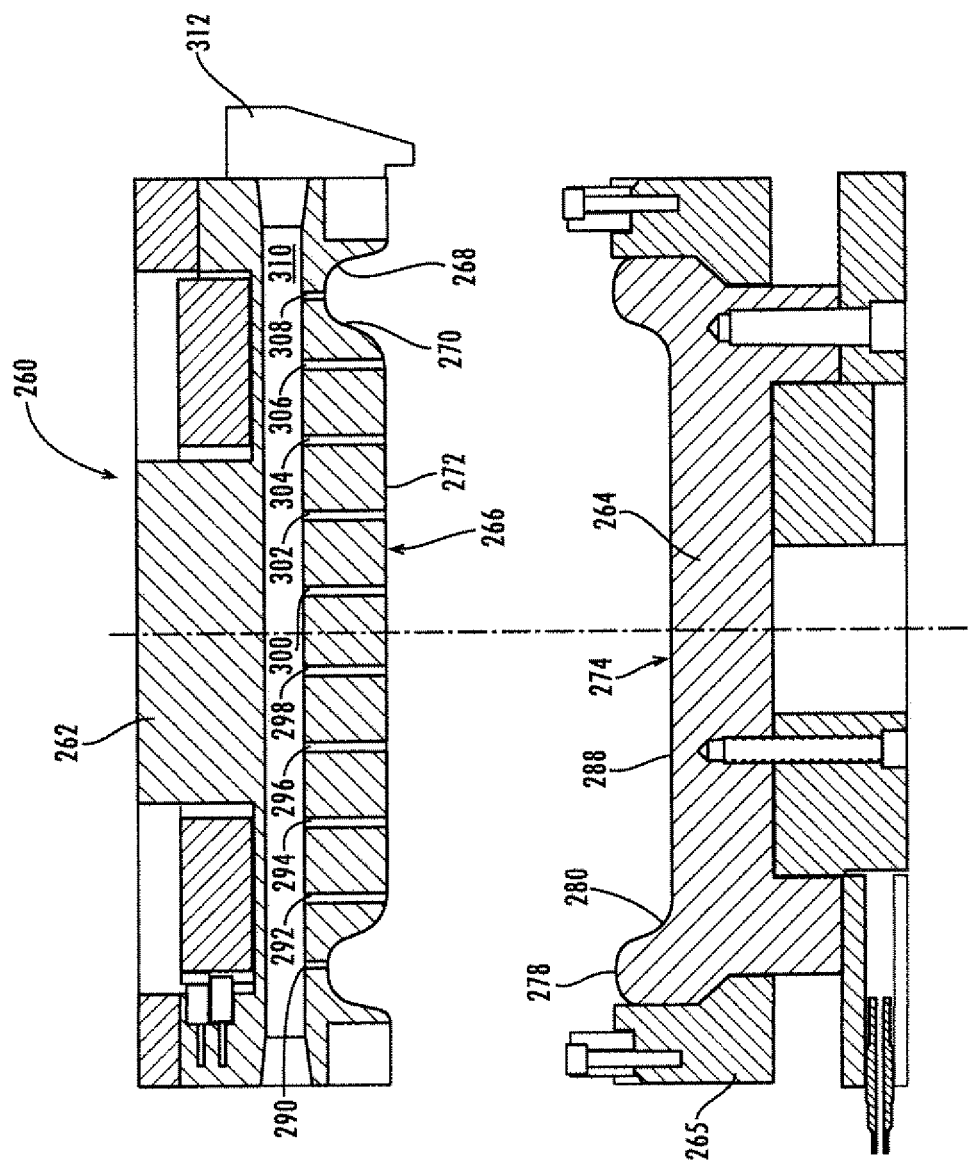

There is likewise typically defined an intermediate radius of curvature 142 as well as inner radius of curvature R1 as shown in FIG. 11. Plate 170 is further provided with an annular evert portion 191 around its perimeter having a horizontal span 193. This feature provides remarkable strength as is discussed in detail in co-pending U.S. patent Ser. No. 10/963,686, which disclosure is incorporated herein in its entirety by this reference.

As is also shown in FIG. 11A, X4 corresponds generally to the radius from center to the outer periphery of a plate; X1 corresponds to the radius of the bottom of the plate that is, the radius of the serving or cutting area of the container, Y1 corresponds to the height of the origin of inner radius of curvature R1 above the bottom of the plate, Y is the radius from the center of the plate to origin R2, X3 is the radius from the center of the plate to the origin of R3, R1 is the radius of curvature of the first annular transition portion 174, A1 is the sidewall angle defined between the linear portion 180 of the sidewall and a vertical 184, R2 is an intermediate radius of curvature, the origin of which is at a height Y2 above the bottom of the container, R3 is the radius of curvature of arcuate outer flange portion 186. Y3 is the height above the bottom of the container of the origin of the radius R3. A2 is the angle of the arc defined by the outer arcuate flange portion 186 having a radius of curvature, RU. Y4 is the height above the bottom of the container of the outer and lower periphery of the brim portion 56 and Y5 is the overall height of the product. Typical ratios are conveniently based on the diameter, D, of the product, that is twice the radius, X4 for a circular product. For other shapes an average radius can be used. For example, the height to diameter ratio for a particular product is calculated as Y5 divided by 2X4, for example.

Further detail as to the design and manufacture of products of the class of FIGS. 9-11A are seen in co-pending U.S. patent application Ser. No. 10/963,686 entitled "Pressed Paperboard Servingware with improved Rigidity and Rim Stiffness," previously incorporated by reference. The products described in connection with FIGS. 1A-9 of the '686 application having the properties enumerated in Tables 1-4 of the '686 application can be preferred products made in accordance with the present invention. Those Figures and Tables are incorporated herein by reference, With respect to apparatus and process, FIGS. 16-25 and the text relating thereto at p. 57, line 17+ to page 61, line 9 of the '686 application are incorporated herein by reference.

There is shown in FIG. 11B the profile of yet another pressware product that can be manufactured in accordance with the invention. In FIG. 11B there is shown a profile from center of a plate 170*b* with a bottom planar portion 172*b*, a first annular transition portion 174*b* and a sidewall portion 176*b*. A second annular transition portion 178*b* extends between sidewall portion 176*b* and an inner flange portion 175*b*. Inner flange portion 175*b* extends to outer arcuate flange portion 186*b*. Here again, the sidewall defines a generally linear profile as indicated at 180*b*. In FIG. 11B X4 corresponds generally to the radius from center to the outer periphery of the plate, X1 corresponds to the radius of the bottom of the plate, that is the radius of the serving or cutting area of the container, Y1 corresponds to the height of the origin of inner radius of curvature, R1, above the bottom of the plate, X2 is the radius from the center of the plate to the beginning of inner flange portion 175*b*, X3 is the radius from the center of the plate to the end of the inner flange portion 175*b*, R1 is the radius of curvature of the first annular transition portion 174*b*, A1 is the sidewall angle defined between the linear portion 180*b* of the sidewall and a vertical 184*b*, R2 is the intermediate radius of curvature, the origin of which is a height Y2 above the bottom of the container, R3 is the radius of curvature of arcuate outer flange portion 186*b*. Y3 is the height above the bottom of the container of the origin of the radius R3 (labeled 183*b* on FIG. 11B), A2 is the included angle of the arc defined by the outer arcuate flange portion 183*b* having radius of curvature, R3, Y4 is the height above the bottom of the container of the outermost periphery of arcuate outer flange portion 186*b* and Y5 is the overall height of the product. Typical ratios or shape factors are conveniently based on the characteristic diameter of the product, that is, twice X4 for a circular product. Inner flange 175*b* has a horizontal span 177*b* between the second transition and outer arcuate flange.

Further details and suitable product shapes are seen in U.S. Pat. Nos. 6,715,630; 5,326,020; and 5,088,640, which disclosures are incorporated herein in their entireties by this reference. Products of the class shown in FIG. 11B are seen in U.S. Pat. No. 6,715,630 entitled "Disposable Food Container With a Linear Sidewall Profile and an Arcuate Outer Flange". The products described in connection with FIGS. 1A-13 and 15-17 of the '630 patent having the characteristics and properties enumerated in Tables 1-13 of the '630 patent can likewise be preferred products made in accordance with the present invention. Those Figures and Tables are incorporated herein by reference.

It will be appreciated by comparison of the products of the invention with the pressware, that the profile of the formed container corresponds to the profile of the forming die pair in which it was made. That is to say, a typical forming die pair has a substantially planar bottom portion, a sidewall portion, and a brim portion. The forming die pair can also be fluted when multiple paperboard webs are formed in the process of the present invention, for example, when white no print plates are used. The containers made with the respective die pairs likewise have corresponding features.

The present invention can employ segmented die pairs generally as is known. Coated paperboard can be used. Clay coated paperboard is typically printed, coated with a functional grease/water resistant barer and moistened prior to blanking and forming. When white no print plates are made, the paperboard can be coated or uncoated.

The optionally pre-treated (coated, moistened and/or printed) paperboard roll is then transferred to a web fed press as shown in FIG. 1 where the optionally scored blanks are cut in a nested pattern (to minimize scrap). The blanks are transferred to the multi-up forming tool via individual transfer chute pairs. In one aspect, the individual transfer chute pairs are gravity fed chute pairs as discussed previously.

The blanks will commonly hit against blank stops (rigid or pin stops that can rotate) for final positioning prior to forming. The stop heights and locations are chosen to accurately locate the blank and allow the formed product to be removed from the tooling without interference. Typically, the inner portions of the blank stops or inner blank stops are lower in height since the formed product must pass over them.

Instead of web forming, blanks could be scored and rotary cut or reciprocally cut. The blanks could be transferred to the forming tooling via transfer chute pairs using a blank fed style press. The overall productivity of a blank feed style press is typically lower than a web feed style press since the stacks of blanks must be continually inserted into the feed section, the presses are commonly narrow in width with fewer forming positions available; and the forming speeds are commonly less since fluid hydraulics are typically used versus mechanical cams and gears.

As noted, the blank is positioned by rigid or rotating pin stops as well as by side edge guides that contact the blank diameter. The punch pressure ring contacts the blank, clamping it against the lower draw ring and optional relief area to provide initial pleating control. The upper punch and lower die knock-outs (that can have compartment ribs machined into them) then contact the paperboard holding the blank on center. The upper knock-out is sometimes an articulated style having 0.030 inch to 0.120 inch articulation stroke during the operation. The pressure ring can have the outer product profile machined into it and provides further pleating control by clamping the blank between its profile area and die outer profile during the formation. The draw ring and pressure ring springs typically can be chosen in a manner to allow full movement of the draw ring prior to pressure ring movement (i.e., full spring force of draw ring is less than or equal to the pre-load of the pressure ring springs).

The following patents and patent applications contain further information as to materials, processing techniques and equipment and are also incorporated by reference as to product designs, materials and processing techniques: U.S. Pat. Nos. 6,715,630, 6,733,852, 6,474,497, 6,893,693, 6,585,506, 6,592,357, 6,589,043, 5,249,946, 4,832,676, 4,721,500 and 4,609,140, as well as U.S. application Ser. Nos. 10/963,686, 11/057,959.

The product of the invention can be advantageously formed with a heated matched pressware die pair. For paperboard plate stock having a thickness of from about 0.008 to about 0.040 inches, the springs upon which the lower die half is mounted are typically constructed such that the full stroke of the upper die results in a force applied between the dies of from about 6,000 to about 14,000 pounds or higher. Similar forming pressures and control thereof can likewise be accomplished using hydraulics as will be appreciated by one of skill in the art.

The paperboard web that is formed into the blanks is conventionally produced by a wet laid paper making process and is typically available in the form of a continuous rolled web. The paperboard web generally has a basis weight in the range of from about 100 pounds to about 400 pounds per 3000 square foot ream and a thickness or caliper in the range of from about 0.008 to about 0.040 inches. Lower basis weight paperboard can be used for ease of forming and to save on material costs.

Paperboard stock utilized for forming pressware can typically be formed from bleached pulp fiber and can be double clay coated on one side. Such paperboard stock commonly has a moisture (water content) varying from about 4.0 to about 8.0 percent by weight.

The effect of the compressive forces at the rim of the paperboard blank is greatest when the suitable moisture conditions are maintained within the paperboard: Moisture content can be from at least about 8% and to less than about 12% water by weight, or from about 9.0 to about 10.5%. Paperboard having moisture in this range typically has sufficient moisture to deform under pressure, but not such excessive moisture that water vapor interferes with the forming operation or that the paperboard is too weak to withstand the forces applied.

To achieve the desired moisture levels within the paperboard web as it comes off the roll, the paperboard stock can treated by spraying or rolling on a moistening solution, primarily water, although other components such as lubricants can be added. The moisture content can be monitored with a hand held capacitive type moisture meter to verify that the desired moisture conditions are being maintained or the moisture is monitored by other suitable means, such as an infra-red system. Generally, the plate stock will not be formed for at least six hours after moistening to allow the moisture within the paperboard to reach equilibrium.

Because of the intended end use of the pressware products made using the apparatus and methods of the present invention, the paperboard stock is typically impregnated with starch and coated on one side with a liquid proof layer or layers comprising a press-applied, water-based coating applied over the inorganic pigment typically applied to the board during manufacturing. Carboxylated styrene-butadiene resins can be used as coatings with or without filler if so desired.

In addition, for aesthetic reasons, the paperboard stock is often initially printed before being coated. As an example of typical coating scenario, a first layer of latex coating can be applied over printed paperboard with a second layer of acrylic coating applied over the first layer. These coatings can be applied either using the conventional printing press used to apply the decorative printing or can be applied using some other form of a conventional press coater. Coatings utilized in connection with the invention can include 2 pigment (clay) containing layers, with a binder, of about 6 lbs/3000 ft.sup.2 ream or so followed by 2 acrylic layers of about 0.5 to about 1 lbs/3000 ft.sup.2 ream.

The clay containing layers can be provided first during board manufacture and the acrylic layers can then be applied by press coating methods, i.e., gravure, coil coating, flexographic methods. Alternatively, extrusion or film laminating methods can be used.

A layer comprising a latex can contain any suitable latex known to the art. By way of example, suitable latexes include one or more of styrene-acrylic copolymer, acrylonitrile styrene-acrylic copolymer, polyvinyl alcohol polymer, acrylic acid polymer ethylene vinyl alcohol copolymer, ethylene-vinyl chloride copolymer, ethylene vinyl acetate copolymer, vinyl acetate acrylic copolymer, styrene-butadiene copolymer and acetate ethylene copolymer. The layer comprising a latex can contain strene-acrylic copolymer, styrene-butadiene copolymer, or vinyl acetate-acrylic copolymer. A commercially available vinyl acetate ethylene copolymer is "AIRFLEX® 100 HS" latex. (Air Products and Chemicals, Inc.)

The layer comprising latex can comprise a latex that is pigmented. Pigmenting the latex increases the coat weight of the layer comprising a latex thus reducing runnability problems when using blade cutters to coat the substrate. Pigmenting the latex can also improve the resulting quality of print that can be applied to the coated paperboard. Suitable pigments or fillers include kaolin clay, delaminated clays, structured clays, calcined clays, alumina, silica, aluminosilicates, talc, calcium sulfate, ground calcium carbonates, and precipitated calcium carbonates. Other suitable pigments are disclosed, for example, in Kirk-Othmer, Encyclopedia of Chemical Technology, Third Edition, Vol. 17, pp. 798, 799, 815, 831-836, incorporated herein by reference. The pigment can be selected from the group consisting of kaolin clay and conventional delaminated coating clay. An available delaminated coating clay is "HYDRAPINT" slurry, supplied as a dispersion with a slurry solids content of about 68%.

"HYDRAPRINT" slurry is a trademark of Huber. The layer comprising a latex can also contain other additives that are well known in the art to enhance the properties of coated paperboard. By way of example, suitable additives include dispersants, lubricants, defoamers, film-formers, antifoamers and crosslinkers. By way of example, "DISPEX N-4" is one suitable organic dispersant and comprises a 40% solids dispersion of sodium polycarboxylate. "DISPEX N-40" is a trademark of Allied Colloids. By way of example, "BERCHEM 4095" is one suitable lubricant and comprises 100% active coating lubricant based on modified glycerides. "BERCHEM 4095" is a trademark of Bercen. By way of example, "Foamaster DF-177NS" is one suitable defoamer. "Foamaster DF-122 NS" is a trademark of Henkel.

Typically, paperboard for containers contains up to about 6% starch; however, the rigidity can be considerably enhanced by using paperboard with from about 9 to about 12 weight percent starch. See U.S. Pat. Nos. 5,938,112 and 5,326,020, the disclosures of which are incorporated herein by reference.

The paperboard stock is typically moistened on the uncoated side after all of the printing and coating steps have been completed. In a typical forming operation, the paperboard web is fed continuously from a roll through a scoring and cutting die to form the blanks which are scored and cut before being fed into position between the upper and lower die halves. The die pairs are heated as described above, to aid in the forming process.

In particular, it has been found that excellent results can be obtained if the upper die half and lower die half—particularly the surfaces thereof—are maintained at a temperature in the range of from about 250.degree. F. to about 400.degree. F. or from about 325.degree. F.+−0.25.degree. F. These die temperatures have been found to facilitate the plastic deformation of paperboard in the rim areas if the paperboard has the preferred moisture levels. At such pressing temperatures, the amount of heat applied to the blank is sufficient to liberate the moisture within the blank and thereby facilitate the deformation of the fibers without overheating the blank and causing blisters from liberation of steam or scorching the blank material.

It is apparent that the amount of heat applied to the paperboard can vary with the amount of time that the dies dwell in a position pressing the paperboard together. The stated die temperatures are based on the typical dwell times encountered for normal plate production speeds of about 40 to about 60 pressings a minute, and commensurately higher or lower temperatures in the dies would generally be required for higher or lower production speeds, respectively.

Without intending to be bound by theory, it is believed that increased moisture, temperature, and pressure in the region of the pleat during pleat formation facilitates rebonding of lamellae in the pleats; accordingly, if insufficient rebonding is experienced, it can generally be addressed by increasing one or more of temperature, pressure or moisture.

Figure 9:
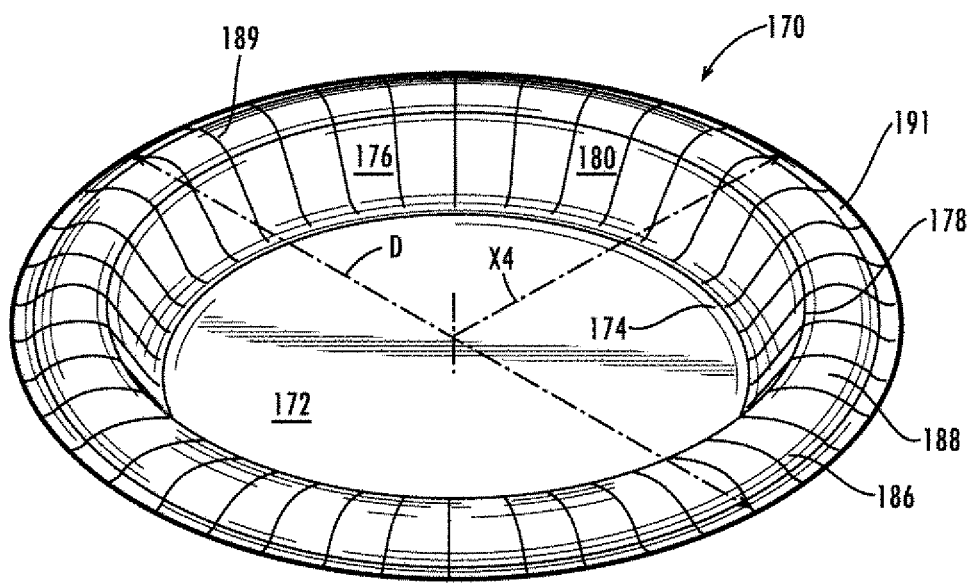
FIG. 9 is a schematic view of a pleated pressware plate formed in accordance with the invention.
Figure 10:
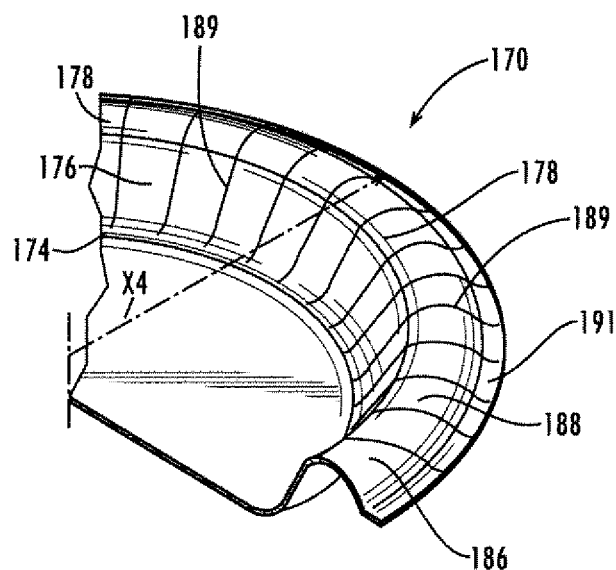
FIG. 10 is an enlarged schematic view of a portion of the pressware container of FIG. 9.
Figure 12:
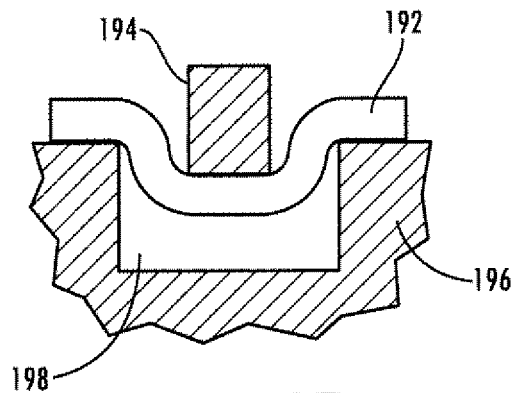
FIGS. 12, 13 and 14 illustrate the operation of a scoring press.
Figure 13:
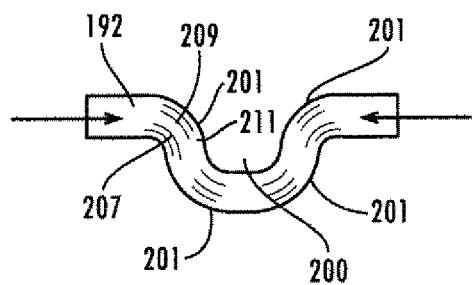
Figure 14:
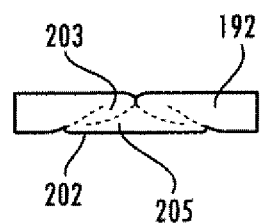

In FIG. 12 there is shown a portion of paperboard stock 192 positioned between a score rule 194 and a scoring counter 196 provided with a channel 198 as would be the case in a scoring press or scoring portion of a pressware forming station. The geometry is such that when the press proceeds reciprocally downwardly and scores blank 192, U-shaped score 200 results. At least incipient delamination of the paperboard into lamellae indicated at 207, 209, 211 is believed to occur in the sharp corner regions indicated at 201 in FIG. 13. The same reciprocal scoring operation could be performed in a separate press operation to create blanks that are fed and formed subsequently. Alternatively, a rotary scoring and blanking operation can be utilized as is known in the art. When the product is formed in a heated matched pressware forming tool, preferably a generally U-shaped pleat 202 with a plurality of rebonded paperboard lamellae along the pleat is formed such that pleats 202 (or 189 as shown in FIG. 9 and in FIG. 10) have the configuration shown schematically in FIG. 14. While the pleats will often have this structure, in other cases a Z or S shaped pleat can be formed, corresponding in essence to ½ of a U-shaped pleat.

During the forming process, internal delamination of the paperboard is followed by rebonding of the lamellae under heat and pressure into a substantially integrated fibrous structure generally inseparable into its constituent lamellae. The pleat can have a thickness generally equal to the circumferentially adjacent areas of the rim and most preferably is more dense than adjacent areas. Integrated structures of rebonded lamellae are indicated schematically at 203, 205 in FIG. 14 on either side of paperboard fold lines in the pleat indicated in dashed lines.

The substantially rebonded portion or portions of the pleats 202 in the finished product preferably extend generally over the entire length (about 75% or more) of the score which was present in the blank from which the product was made. The rebonded portion of the pleats can extend only over portions of the pleats in an annular region of the periphery of the article in order to impart strength. Such an annular region or regions can extend, for example, around the container extending approximately from the transition of the bottom of the container to the sidewall outwardly to the outer edge of the container, that is, generally along the entire length of the pleats shown in the Figures above. The rebonded structures can extend over an annular region which is less than the entire profile from the bottom of the container to its outer edge.

The substantially integrated rebonded fibrous structures formed can extend over at least a portion of the length of the pleat, for example, over at least about 50% of the length of the pleat and or over at least about 75% of the length of the pleat. Substantially equivalent rebonding can also occur when pleats are formed from unscored paperboard.

At least one of an optional sidewall portion, the second annular transition portion, and the outer flange portion is provided with a plurality of circumferentially spaced, radially extending regions formed from a plurality of paperboard lamellae rebonded into substantially integrated fibrous structures generally inseparable into their constituent lamellae. The rebonded structures extend around an annular region corresponding to a part of the profile of the optional sidewall, second annular transition portion or the outer flange portion of the container. The integrated structures can extend over at least part of all of the aforesaid profile regions about the periphery of the container. The integrated rebonded structures can extend generally over the length of the pleats, over at least about 75% of their length, for instance; however, so long as a majority of the pleats, more than about 50% for example, include the rebonded structures described herein over at least a portion of their length, a substantial benefit is realized. The rebonded structures can define an annular rebonded array of integrated rebonded structures along the same part of the profile of the container around an annular region of the container.

Figure 15:
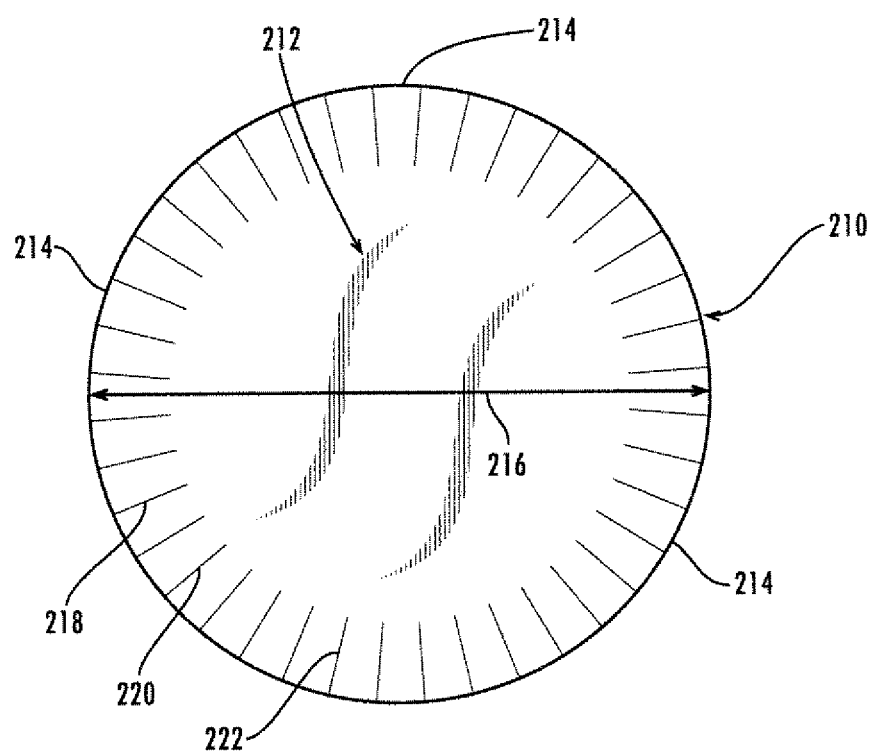
FIG. 15 is a schematic view showing a scored paperboard blank with a circular perimeter.

A suitable paperboard blank to make the inventive containers is shown in plan view in FIG. 15. In FIG. 15 a paperboard blank 210 is generally planar and includes a central portion 212 defining generally thereabout a perimeter 214 having a diameter 216. There is provided about the circular perimeter 214 of blank 200 a plurality of scores such as scores 218, 220 and 222. The scores can be evenly spaced and facilitate formation of evenly spaced pleats 202 as noted above.

Figure 16:
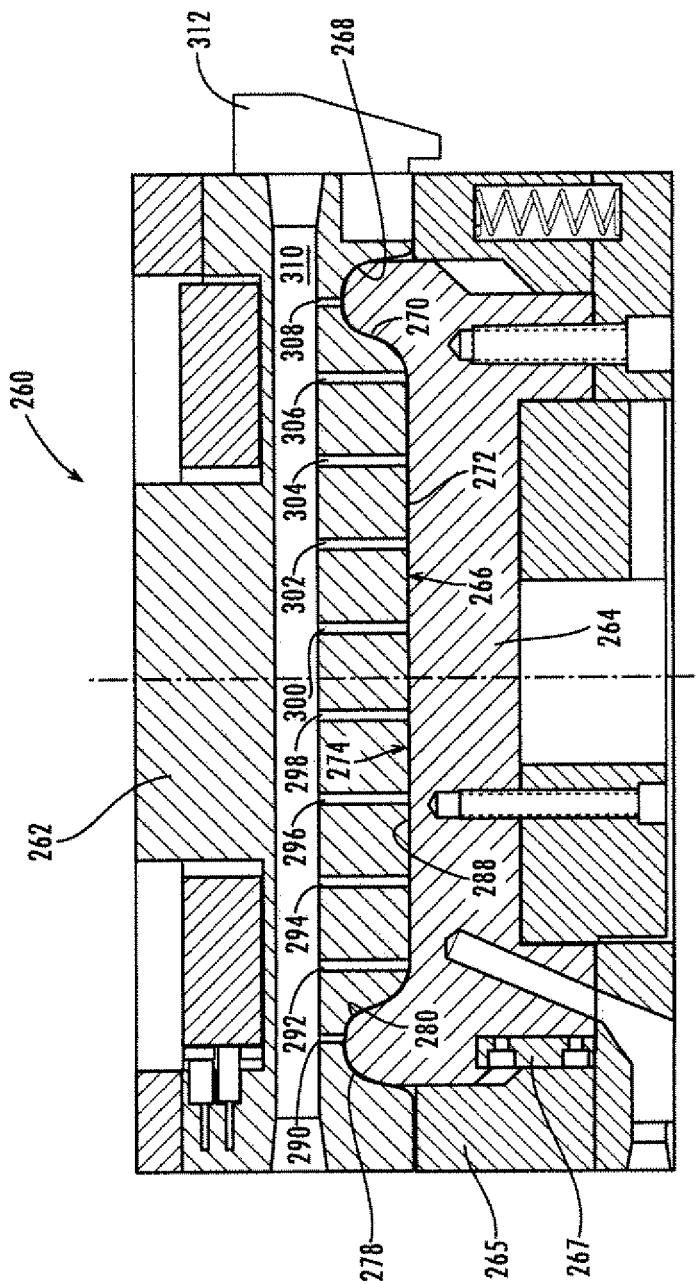
Figure 18:
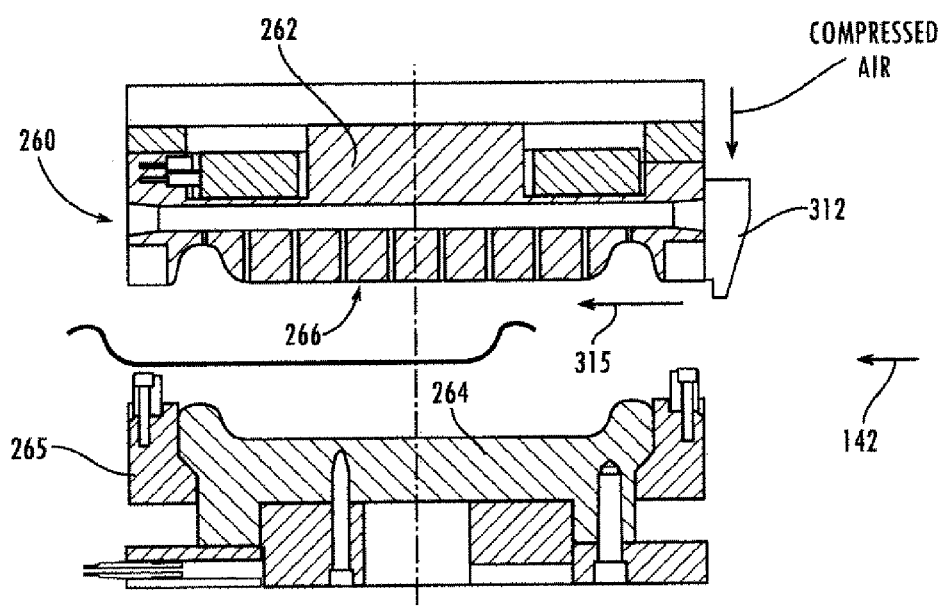

Still yet further features of the present invention are shown in FIGS. 16, 17 and 18. FIG. 16 is a schematic diagram in section, of a pressware die pair in a closed position while FIG. 17 is a schematic view, in section, of the pressware forming tool of FIG. 16 in an open position. In general, the inventive die 260 includes an upper punch portion 262 as well as a lower forming profile 264. Punch portion 262 has a unitary forming member 266, that is to say, member 266 is a single part which defines a profile including a down-turned brim portions 268, a sidewall portion 270 as well as a central portion 272. Forming profile 264 also has a forming surface at 274 with portions defining a down turned brim 278, a sidewall portion at 280 and a central portion at 288. The various portions of the punch and die forming surfaces form corresponding shapes on the pressware made in the pressware forming tool.

A salient feature of unitary forming member 266 is a plurality of pneumatic ejector conduits such as conduits 290, 292, 294, 296, 298, 300, 302, 304, 306 and 308 communicating with a plenum 310 located within the punch and so forth, which can be provided with compressed air, for example, to remove a formed product from the punch. Ejector conduits in the unitary forming member 266 can be arranged in an X pattern extending from side to side of the forming member across substantially its entire span. In addition to the pneumatic ejector conduits in member 266, there is optionally provided an ejector 312 secured to punch portion 262 which provides a jet 315 of air along production direction 142 as shown in FIG. 18 in order to advance the formed product. Forming profile 264 is undercut to accommodate a draw ring 265 and is provided with a plurality of keys such as key 267 in order to prevent rotation of the draw ring.

FIG. 19 illustrates a particularly suitable die pair 350 that can be disposed in a multilevel array of the invention that utilizes the enhanced ring stops referenced previously. Die pair 350 includes an upper punch 352 with a punch base 354 and a removable contour 356 with an annular undercut 358 defining a tapered shoulder 360. A pressure ring 362 has an annular, tapered projection 364 which cooperates with shoulder 360 in order to limit motion of the ring. Projection 364 extends around the punch and there are a plurality of keys indicated at 366 in order to limit rotation of ring with respect to other segments. Punch 352 also includes an articulated knock-out 368.

Die 370 has a die base 372, a removable contour 374, a draw ring 376 and a knock-out 378. Knock-out 378 has a shaft 380 provided with a tapered ring 382 which cooperates with a tapered bushing 384 to limit the stroke of the knock-out as the pressware forming tool reciprocates. The tapered ring and bushing also act to center the knock-out. Removable contour 374 has an annular undercut 386 that cooperates with an annular projection 388 on draw ring 376 as noted above in connection with the pressware forming tool of FIGS. 7 and 16-18. FIG. 19 also has a mounting member 390.

While the invention has been described in detail in numerous aspects, modifications within the spirit and scope of the invention will be readily apparent to those of skill in the art. In view of the foregoing discussion, relevant knowledge in the art, related applications and publications discussed above in connection with the Background and Detailed Description, the above-noted disclosures of which are all incorporated herein by reference, further description is deemed unnecessary.

What is claimed is:

1. An apparatus for forming a pressware product from a paperboard blank, comprising:
at least two die assemblies, each die assembly comprising an upper punch portion and a lower die portion for forming a paperboard blank into a formed pressware product, wherein at least one die assembly has a cross-directional width that is less than 105% of a cross-directional width of the paperboard blank.

2. The apparatus of claim 1, wherein the cross-directional width of the at least one die assembly is substantially the same as the cross-directional width of the paperboard blank.

3. The apparatus of claim 1, wherein the cross-directional width of the at least one die assembly is of from about the cross-directional width of the paperboard blank to about 105% of the cross-directional width of the paperboard blank.

4. The apparatus of claim 1, wherein the at least two die assemblies each have a cross-directional width that is less than 105% of the cross-directional width of the paperboard blank.

5. The apparatus of claim 1, wherein the at least two die assemblies are positioned at the same elevation.

6. The apparatus of claim 1, wherein the at least two die assemblies are positioned at different elevations.

7. The apparatus of claim 1, wherein the at least two die assemblies are positioned side by side at the same or different elevations.

8. The apparatus of claim 1, wherein the at least two die assemblies comprises from five die assemblies to seven die assemblies all arranged side by side at the same elevation.

9. The apparatus of claim 1, wherein the at least two die assemblies are arranged side by side at alternating elevations.

10. The apparatus of claim 1, wherein the cross-directional width of the at least one die assembly is about 0% to about 4% larger than the cross-directional width of the paperboard blank.

11. The apparatus of claim 1, wherein the paperboard blank is multi-sided, round, or oval.

12. The apparatus of claim 1, wherein the formed pressware product is pleated.

13. The apparatus of claim 1, wherein the formed pressware product has a caliper of from about 8 to about 40 mils.

14. An apparatus for forming a pressware product from a paperboard blank, comprising:
first and second die assemblies each comprising an upper punch portion and a lower die portion for forming a paperboard blank into a formed pressware product, wherein the first die assembly is positioned at a different elevation than the second die assembly.

15. The forming station of claim 14, further comprising a third die assembly, wherein the third die assembly is positioned at substantially the same elevation as the first die assembly.

16. The forming station of claim 15, wherein the second die assembly is positioned between the first and third die assemblies.

17. The forming station of claim 14, further comprising:
a first conveyor coupled to the first die assembly and adapted to convey a first paperboard blank thereto; and
a second conveyor coupled to the second die assembly and adapted to convey a second paperboard blank thereto, wherein the first conveyor is positioned at a different elevation than the second conveyor.

18. The forming station of claim 17, wherein the first conveyor is oriented at an incline such that the first paperboard blank is gravity-fed to the first die assembly.

19. The forming station of claim 14, wherein the paperboard blank is multi-sided, round, or oval, and wherein the formed pressware product has a caliper of from about 8 to about 40 mils.

20. A system for forming pressware products, comprising:
- a scoring station comprising a plurality of scoring rules and a plurality of score grooves arranged in a nested pattern that correspond to the scoring rules;
- a blanking station coupled to the scoring station and comprising a plurality of male cutting dies and a plurality of female recesses corresponding to the male cutting dies, the male cutting dies and the female recesses adapted to cut paperboard blanks from a web of material;
- a conveying system coupled to the blanking station and comprising a plurality of chute pairs adapted to transport the paperboard blanks; and
- an apparatus for forming a pressware product from a paperboard blank, comprising:
  - at least two die assemblies, each die assembly comprising an upper punch portion and a lower die portion for forming a paperboard blank into a formed pressware product, wherein at least one die assembly has a cross-directional width that is less than 105% of a cross-directional width of the paperboard blank or wherein a first of the at least two die assemblies is positioned at a different elevation than a second of the at least two die assemblies, and wherein the apparatus is coupled to the conveying station and adapted to receive the paperboard blanks therefrom.

\* \* \* \* \*